United States Patent
Yamada et al.

(10) Patent No.: US 8,816,818 B2
(45) Date of Patent: Aug. 26, 2014

(54) BIOMETRIC AUTHENTICATION DEVICE AND METHOD, COMPUTER-READABLE RECORDING MEDIUM RECORDED WITH BIOMETRIC AUTHENTICATION COMPUTER PROGRAM, AND COMPUTER SYSTEM

(75) Inventors: Shigefumi Yamada, Kawasaki (JP); Koichiro Niinuma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 469 days.

(21) Appl. No.: 12/631,263

(22) Filed: Dec. 4, 2009

(65) Prior Publication Data

US 2010/0148922 A1 Jun. 17, 2010

(30) Foreign Application Priority Data

Dec. 16, 2008 (JP) ................................ 2008-319611

(51) Int. Cl.
*G05B 19/00* (2006.01)
*G06F 21/32* (2013.01)

(52) U.S. Cl.
CPC ...................................... *G06F 21/32* (2013.01)
USPC ......... 340/5.82; 340/5.83; 340/5.52; 340/5.53

(58) Field of Classification Search
None
See application file for complete search history.

(56) References Cited

U.S. PATENT DOCUMENTS

| | | | | |
|---|---|---|---|---|
| 5,040,223 A * | 8/1991 | Kamiya et al. | ................. | 382/127 |
| 5,631,309 A * | 5/1997 | Yanagi et al. | ................. | 523/160 |
| 5,901,255 A * | 5/1999 | Yagasaki | ....................... | 382/310 |
| 6,205,233 B1 * | 3/2001 | Morley et al. | ................. | 382/103 |
| 6,983,061 B2 * | 1/2006 | Ikegami et al. | ............... | 382/115 |
| 7,634,117 B2 * | 12/2009 | Cho | .............................. | 382/124 |
| 7,636,853 B2 * | 12/2009 | Cluts et al. | .................... | 713/186 |
| 8,150,108 B2 * | 4/2012 | Miller | ............................. | 382/116 |
| 2003/0016297 A1 | 1/2003 | Shigeta | | |
| 2006/0047970 A1 | 3/2006 | Mochizuki | | |
| 2006/0078177 A1 * | 4/2006 | Niinuma et al. | .............. | 382/124 |
| 2007/0036400 A1 | 2/2007 | Watanabe et al. | | |
| 2007/0047771 A1 * | 3/2007 | Watanabe et al. | ............ | 382/115 |
| 2007/0237367 A1 * | 10/2007 | Yamato et al. | ................ | 382/118 |

FOREIGN PATENT DOCUMENTS

| | | |
|---|---|---|
| JP | 7-121712 | 5/1995 |
| JP | 2006-107340 | 4/2006 |
| JP | 2007-213126 | 8/2007 |
| WO | 2008/007116 | 1/2008 |

OTHER PUBLICATIONS

Extended European Search Report dated Apr. 2, 2014 in corresponding European Patent Application No. 09178668.1.

* cited by examiner

*Primary Examiner* — Nabil Syed
*Assistant Examiner* — Brian Wilson
(74) *Attorney, Agent, or Firm* — Staas & Halsey LLP

(57) ABSTRACT

A computer system checks whether or not an authentication success rate for a registered user shows an over-time reduction based on the history of the results of the previous biometric authentication processes in which the high-speed verification process is executed, when the authentication success rate is determined as showing an over-time reduction for the registered user, the computer system instead executes a precise verification process for verifying input biometric information against registered biometric information to make verification with a higher precision than with the high-speed verification process.

14 Claims, 14 Drawing Sheets

FIG. 4

| TIME AND DATE OF VERIFICATION | VERIFICATION PROCESS TYPE IN USE | DEGREE OF SIMILARITY | AUTHENTICATION RESULT |
|---|---|---|---|
| 2008/6/23 9:05 | 1 (HIGH-SPEED VERIFICATION PROCESS) | 0.72 | 1 (SUCCESS IN AUTHENTICATION) |
| 2008/6/24 9:42 | 1 | 0.66 | 0 (FAILURE IN AUTHENTICATION) |
| 2008/6/24 9:44 | 1 | 0.70 | 1 |
| 2008/6/25 9:32 | 1 | 0.65 | 0 |
| 2008/6/25 9:35 | 2 (PRECISE VERIFICATION PROCESS) | 0.85 | 1 |

FIG. 5

| REGISTERED USER IDENTIFICATION INFORMATION | VERIFICATION PROCESS TYPE IN USE |
|---|---|
| abcd001 | 1 (HIGH-SPEED VERIFICATION PROCESS) |
| efgh002 | 2 (PRECISE VERIFICATION PROCESS) |
| ijkl003 | 2 |
| mnop004 | 1 |
| qrst005 | 1 |

FIG. 13

| TIME AND DATE OF VERIFICATION | VERIFICATION PROCESS TYPE IN USE | DEGREE OF SIMILARITY | AUTHENTICATION RESULT | QUALITY |
|---|---|---|---|---|
| 2008/6/23 9:05 | 1 (HIGH-SPEED VERIFICATION PROCESS) | 0.72 | 1 (SUCCESS IN AUTHENTICATION) | 1 (HIGH QUALITY) |
| 2008/6/24 9:42 | 1 | 0.66 | 0 (FAILURE IN AUTHENTICATION) | 1 |
| 2008/6/24 9:44 | 1 | 0.70 | 1 | 1 |
| 2008/6/25 9:32 | 1 | 0.65 | 0 | 0 (LOW QUALITY) |
| 2008/6/25 9:35 | 2 (PRECISE VERIFICATION PROCESS) | 0.85 | 1 | 0 |

BIOMETRIC AUTHENTICATION DEVICE AND METHOD, COMPUTER-READABLE RECORDING MEDIUM RECORDED WITH BIOMETRIC AUTHENTICATION COMPUTER PROGRAM, AND COMPUTER SYSTEM

CROSS-REFERENCE TO RELATED APPLICATIONS

This application is based upon and claims the benefit of priority of the prior Japanese Patent Application No. 2008-319611, filed on Dec. 16, 2008, the entire contents of which are incorporated herein by reference.

BACKGROUND

A biometric authentication technology has recently been developed for authenticating a device or system user using biometric information such as fingerprints and palm prints. With a biometric authentication device utilizing such a biometric authentication technology, biometric information about a user who wants to use the biometric authentication device is acquired as input biometric information. The input biometric information is verified against previously-registered biometric information about a previously-registered user(s), for example. If the biometric authentication device determines that the input biometric information coincides with the previously-registered biometric information, the user is authenticated as an authorized user based on the result of such a verification process. The biometric authentication device then gives permission to the authenticated user to use the biometric authentication device or any other device connected thereto.

Such a biometric authentication device is expected to reliably make available the previously-registered users for verification use. For the this purpose, there is a known technology of storing a history of previous verification results as verification information, and based on the verification information, determining an assessment threshold value for use as an assessment criterion for every verification assessment.

In addition to reliably making available the previously-registered users for verification, such a biometric authentication device is also considered desirable to complete a verification process in a short time. For not increasing the processing time needed for completion of a verification process, there is a known technology of making verification by pattern matching only when a first coincidence level found by characteristic-point matching is of a first threshold value or smaller and is of a second threshold value or larger, for example. Also for not increasing the processing time needed for completion of a verification process, there is another known technology of reducing the processing time for verification by using the quality of fingerprint data as a base to change how to make verification.

Patent Document 1: JP-A-7-121712
Patent Document 2: JP-A-2006-107340
Patent Document 3: JP-A-2007-213126

SUMMARY

According to an aspect of the invention, a biometric authentication device includes a biometric information acquisition section that acquires input biometric information of a user, and generates input biometric data representing the input biometric information, a storage section that stores therein registered biometric data representing registered biometric information about at least one registered user who is registered in advance, a first verification process section that executes a first verification process of calculating a first degree of similarity representing a degree of similarity between the input biometric information and the registered biometric information, a second verification process section that executes a second verification process of calculating a second degree of similarity representing the degree of similarity between the input biometric information and the registered biometric information by verifying the input biometric information against the registered biometric information with higher precision than with the first verification process, an authentication assessment section that authenticates, when the first or second degree of similarity takes a value larger than a predetermined verification assessment threshold value, the user as a registered user corresponding to the registered biometric information, a verification history update section that stores the first degree of similarity calculated by the first verification process into the storage section with a correlation with the registered biometric data representing the registered biometric information verified against the input biometric information, and a verification process change section that changes, by referring to the first degree of similarity correlated with the registered biometric data stored in the storage section, when an authentication success rate indicating a rate of authenticating the registered user as the user is determined as showing an over-time reduction, the first verification process to the second verification process for execution to the registered biometric information.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

The above-described embodiments of the present invention are intended as examples, and all embodiments of the present invention are not limited to including the features described above.

BRIEF DESCRIPTION OF THE DRAWINGS

FIG. 4 is a diagram showing an exemplary verification history table;

FIG. 5 is a diagram showing an exemplary reference table indicating the types of a verification process to be executed to each registered user;

FIG. 13 is a diagram showing another exemplary verification history table.

DETAILED DESCRIPTION OF THE PREFERRED EMBODIMENTS

Figure 1:
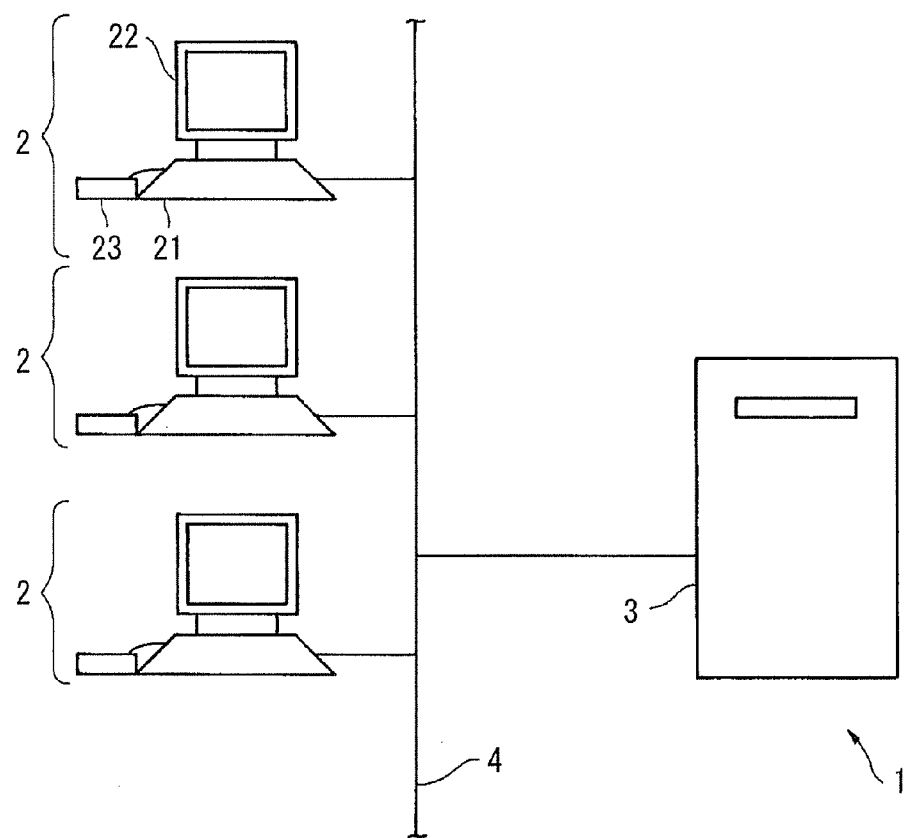
FIG. 1 is a schematic diagram showing the configuration of a computer system adopting the biometric authentication device or method of the invention.

Reference may now be made in detail to embodiments of the present invention, examples of which are illustrated in the accompanying drawings, wherein like reference numerals refer to like elements throughout.

In the following, in a first embodiment, a computer system is described by referring to the accompanying drawings that adopts the biometric authentication device or method of the invention.

The computer system of the first embodiment acquires biometric information of a user as input biometric information when the user logs in the computer system for use thereof. The computer system then verifies the input biometric information against any specific registered biometric information among those others registered in the computer system in advance. The specific registered biometric information is the one about a registered user corresponding to identification information input by the user.

When the result of such a verification process leads to an assessment of the input biometric information coinciding with the registered biometric information, the computer system accordingly authenticates the user as being the registered user. The computer system then gives permission to the user authorized as such to log in thereto. As a rule, the verification process to be executed by the computer system is the high-speed verification process with which an amount of computation is relatively small.

The computer system also assesses whether or not an authentication success rate indicating a rate of success when a user is correctly verified as having been registered shows a reduction over time. Such an assessment is made based on the history of the previous results of the biometric authentication process implemented by the high-speed verification process. When assessing that the authentication success rate shows a reduction over time, the computer system executes a precise verification process to the registered biometric information of the registered user.

The precise verification process requires a larger amount of computation than the high-speed verification process but is with a higher precision than the high-speed verification process. As such, the computer system is aimed to prevent any possible reduction of an authentication success rate for a registered user whose biometric information is changed over time from when it is registered while preventing an increase of time needed for completion of a verification process.

In this specification, the term "verification process" is used to indicate the process of calculating the degree of similarity between input biometric information and registered biometric information. The term "biometric authentication process" indicates an authentication process in its entirety, including not only a verification process but also a process of determining whether or not to authenticate a user using the degree of similarity calculated as a result of the verification process.

FIG. 1 is a schematic diagram showing the configuration of a computer system 1 of the first embodiment. As shown in FIG. 1, the computer system 1 is configured to include three terminals 2, and at least a server 3. The terminals 2 and the server 3 are connected together over a communications network 4 conforming to the communications standard such as the Ethernet™. Note that FIG. 1 exemplarily shows the three terminals 2, but the number of the terminals 2 in the computer system 1 is not restricted to three as such. The computer system 1 can include any appropriate number of terminals 2, i.e., one or more terminals 2, in accordance with the specifications required therefor. Similarly, FIG. 1 exemplarily shows one server 3, but the number of the servers 3 in the computer system 1 is not restrictive to one as such. As an example, for use as the server 3, the computer system 1 may include a master server (or primary server), and at least one slave server (or secondary server) for use of backup or load distribution. When the computer system 1 includes a plurality of servers 3, the terminal(s) 2 each access any of the servers 3 in accordance with predetermined priority levels. The terminal(s) 2 are then each allowed to execute any desired process such as log-in process to the accessed server 3.

The terminal 2 is configured to include an input section 21, a display section 22, and a biometric information input section 23. The terminal 2 is also configured to include a processor (not shown) for control of the terminal 2, and a semiconductor memory (not shown) for storage of data and programs. The data here is the one to be used by the terminal 2, and the programs are those to be run by the terminal 2. The terminal 2 is also provided with a communications interface for a connection of the terminal 2 to the communications network 4, and a control circuit (not shown) thereof.

The input section 21 includes an input device such as keyboard, mouse, or touchpad. The input section 21 is used by a user for input of commands, data, and others. The input section 21 serves also as an identification information input section for input of user's identification information to the terminal 2. The user's identification information may be a character string including alphanumeric characters or symbols, or the user's name.

When the server 3 carries registered biometric information plurally for a single registered user, the input section 21 is used also for input of specification information, which is for specifying which of the registered biometric information is to be used for biometric authentication. For example, when a single registered user is registered with a plurality of fingerprint images of his or her fingers, the specification information is used to specify which finger is used for biometric authentication. The terminal 2 forwards commands, data, or user's identification or specification information provided through the input section 21 to the server 3 over the communications network 4.

The display section 22 includes a display device such as liquid crystal display or CRT (Cathode-Ray Tube) monitor. The display section 22 displays thereon commands, data, or user's identification or specification information provided to the terminal 2 via the input section 21, or various types of information provided by the server 3 and received by the terminal 2. Herein, the input section 21 and the display section 22 may be formed integrally like a touch panel display.

The biometric information input section 23 generates input biometric data that represents input biometric information used for a verification process. In this embodiment, the biometric information input section 23 serves to capture an image of a user's finger, and the resulting image is the input biometric information. The biometric information input section 23 generates, for use as the input biometric data, an input fingerprint image being the captured fingerprint image. For generation of image as such, the biometric information input section 23 is provided with a fingerprint sensor (not shown), which is an integrated structure including a read base for placing a finger thereon, an illumination source such as LED (Light-Emitting Diode) for illuminating the finger during image capturing, and a detector for capturing an image of fingerprint of the finger placed on the read base to generate a fingerprint image.

In this embodiment, as an example, the fingerprint sensor is of total reflection optical type. However, the fingerprint sensor available for use in the computer system 1 is not restrictive to such a sensor of total reflection optical type. The fingerprint sensor can be an optical sensor of various types, e.g., optical-path separation, inter-finger diffused-light detection, inter-finger characteristics detection, and surface enhanced irregular reflection, or a non-optical sensor of various types, e.g., capacitance-operated, electric field-operated, thermally-operated, pressure-sensitive, and ultrasonically-operated. The fingerprint sensor is not restrictive to be of area sensor type, and may be of line sensor type.

With an input fingerprint image generated by the biometric information input section 23, for example, areas of ridges of the fingerprint show a higher pixel value than areas of valleys thereof. Note here that depending on what type of fingerprint sensor the biometric information input sensor 23 uses, e.g., inter-finger characteristic detection type, the areas of ridges of the fingerprint show, conversely, a lower pixel value than the areas of valleys thereof.

When a user operates the input section 21 for log-in, the terminal 2 displays messages on the display section 22, i.e., a message to prompt the user to input his or her identification information, and a message to prompt the user to place his or her finger on the biometric information input section 23. Herein, the operation asking for log-in is to depress, via the input section 21, a button displayed as "log-in" on the display section 22, for example. After acquiring an input fingerprint image via the biometric information input section 23, the terminal 2 correlates the input fingerprint image with the user's identification information provided via the input section 21.

When provided via the input section 21 is specification information about the user's finger for biometric authentication use, the terminal 2 correlates the input fingerprint image also with the specification information about the finger. The terminal 2 then transmits the input fingerprint image to the server 3 over the communications network 4 together with a log-in execution request signal. During transmission as such, the user's identification information or the specification information about the finger is also provided to the server 3.

Figure 2:
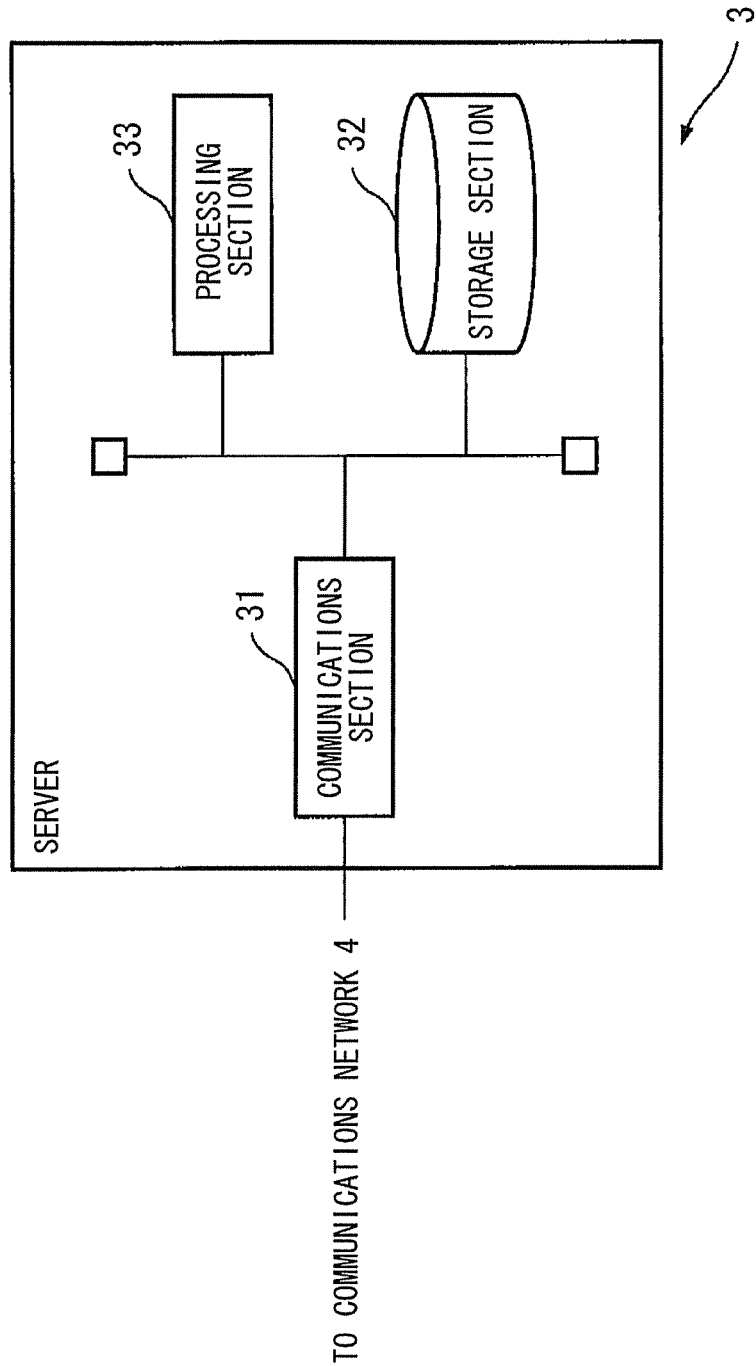
FIG. 2 is a schematic diagram showing the configuration of a server in the computer system adopting the biometric authentication device or method of the invention.

FIG. 2 is a schematic diagram showing the configuration of the server 3. The server 3 is configured to include a communications section 31, a storage section 32, and a processing section 33. The server 3 may also include a keyboard and a mouse (not shown) for a direct operation of the server 3, and a display device (not shown) such as liquid crystal display for display of information provided to the server 3 or information being the processing result by the server 3.

The communications section 31 includes a communications interface for a connection of the server 3 to the communications network 4, and a control circuit thereof. For example, the communications section 31 includes a communications interface for a connection to a communications network conforming to the communications standard such as the Ethernet™ or to the Integrated Services Digital Network (ISDN), and a control circuit thereof. The communications section 31 is provided with commands or data from the terminal 2 over the communications network 4. The communications section 31 then passes the provided commands or data to the processing section 33. When receiving data to any specific terminal 2 from the processing section 33, the communications section 31 sends out the data to the communications network 4.

The storage section 32 includes at least one of a semiconductor memory, a magnetic disk device, and an optical disk device, for example. The storage section 32 stores therein an application program for use in the computer system 1, identification information and individual setting information of at least one registered user, various types of data, and others. The storage section 32 also stores therein a program for execution of the biometric authentication process. The storage section 32 stores, for each registered user, registered biometric data representing registered biometric information about the registered user. In this embodiment, the registered biometric information is the fingerprint of any of the registered user's fingers, and the registered biometric data is a registered fingerprint image of the fingerprint.

The storage section 32 also stores therein a verification history table, flag information, and others, for each registered user. The verification history table is the one indicating the result of the biometric authentication process executed previously, and the flag information is about the type of a verification process to be executed. When storing the registered biometric data plurally for one registered user, the storage section 32 makes the storage for each of the registered biometric data, i.e., stores any related verification history table, and flag information about the type of a verification process to be executed, for example.

The processing section 33 includes one or more processors, and a peripheral circuit thereof. The processing section 33 executes commands requested via the terminal 2, or runs various types of applications. The processing section 33 also executes a process for user's log-in and log-out with respect to the computer system 1. When receiving via the terminal 2 a user's request for execution of a log-in process with respect to the computer system 1, the processing section 33 accordingly executes a biometric authentication process using the user's biometric information.

Figure 3:
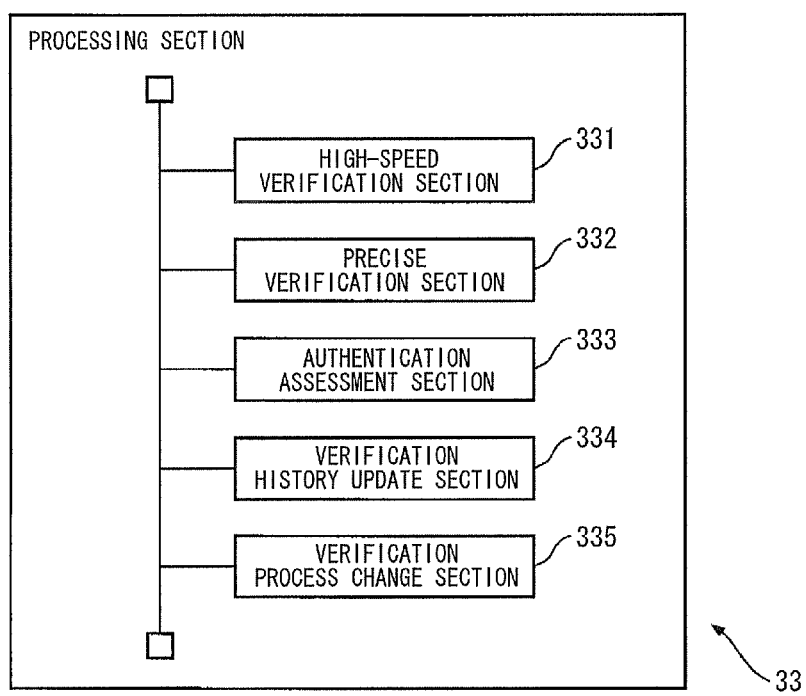
FIG. 3 is a sectional block diagram in the server, showing sections to be implemented for executing a biometric authentication process to a user in a first embodiment.

FIG. 3 is a sectional block diagram of the processing section 33, showing the sections to be implemented for execution of a biometric authentication process to a user. As shown in FIG. 3, the processing section 33 is configured to include a high-speed verification section 331, a precise verification section 332, an authentication assessment section 333, a verification history update section 334, and a verification process change section 335. These components in the processing section 33 are sectional modules to be implemented by a computer program run on the processor(s) in the processing section 33. Alternatively, these components in the processing section 33 may be implemented in the server 3 as firmware.

The processing section 33 also may include a module for executing a log-in or log-out process, and a module for running various types of applications. If this is the configuration, however, any module other than the components of FIG. 3, e.g., a module for executing a log-in or log-out process, has nothing to do with the biometric authentication process, and thus only the components of FIG. 3 are described here.

The high-speed verification section 331 verifies input biometric information against registered biometric information by a high-speed verification process, which requires a less amount of computation than a precise verification process to be executed by the precise verification section 332. In this embodiment, the high-speed verification section 331 verifies the fingerprint in an input fingerprint image of a log-in-asking user provided by the terminal 2 against the fingerprint in a registered fingerprint image of a registered user corresponding to identification information of the log-in-asking user.

When the input fingerprint image is correlated with specification information about a finger of the log-in-asking user together with his or her identification information, the high-speed verification section 331 verifies the fingerprint in the input fingerprint image against the fingerprint in a registered fingerprint image of a registered user identified by such user's identification information and specification information. The high-speed verification section 331 then finds a degree of similarity of the input biometric information against the registered biometric information, i.e., the result of the verification process.

The high-speed verification process to be executed by the high-speed verification section 331 may be pattern matching between a segment of the input fingerprint image and the registered fingerprint image, or pattern matching between a segment of the registered fingerprint image and the input fingerprint image. In the following, a case is exemplified in which the high-speed verification section 331 performs pattern matching between a segment of the input fingerprint image and the registered fingerprint image. Herein, when the high-speed verification section 331 performs pattern matching between a segment of the registered fingerprint image and the input fingerprint image, the following description is applicable with the term "input fingerprint image" replaced with the term "registered fingerprint image", and vice versa.

Herein, the segment of the input fingerprint image may include an area around the center of the fingerprint. For example, the segment of the input fingerprint image may be an area around the center of the fingerprint therein with a width of about a half of the width of the fingerprint in the lateral direction, and with a length of about one-third of the length of the fingerprint in the vertical direction.

First of all, the high-speed verification section 331 binarizes the registered fingerprint image, and the segment of the input fingerprint image for use in pattern matching. As to the segment of the input fingerprint image, the high-speed verification section 331 performs binarization using local thresholding, for example. For the binarization using local thresholding as such, the high-speed verification section 331 calculates an average value of pixels (including a target pixel) in an area proximal to the segment of the input fingerprint image. The area is of a size with 9×9 pixels, for example, and the resulting average value is used as a threshold value.

When the target pixel has a value larger than the threshold value, the high-speed verification section 331 sets a value of "1" to the target pixel, and when the target pixel has a value equal to or smaller than the threshold value, sets a value of "0" to the target pixel. Accordingly, in the binarized segment of the input fingerprint image, the pixels located on the ridge have different values from those located on the valley. For example, the ridge is indicated by a pixel value of "1", and the valley is indicated by a pixel value of "0". The high-speed verification section 331 binarizes also the registered fingerprint image similarly to the segment of the input fingerprint image. Note that, in the following, the binarized segment of the input fingerprint image is referred to as template, and the binarized registered fingerprint image is referred to as binary registered fingerprint image.

Next, using the following equation, the high-speed verification section 331 calculates a correlation value between a template and a binary registered fingerprint image by variously changing their relative positions.

Equation 1

$$c(i, j) = \frac{1}{A}\sum_x \sum_y NXOR(I_b(x, y), T_b(x - i, y - j)) \quad (1)$$

where $I_b(x,y)$ denotes the value of a pixel in the binary registered fingerprint image with the horizontal coordinate of x and the vertical coordinate of y, and $T_b(x-i, y-j)$ denotes the value of a pixel in the template with the horizontal coordinate of x−i and the vertical coordinate of y−j. Herein, i and j respectively denote the displacement amount between the template and the binary registered fingerprint image in the horizontal and vertical directions. In the equation, the section $NXOR(I_b(x,y), T_b(x-i,y-i))$ outputs a value of "1" when the value of $I_b(x,y)$ coincides with the value of $T_b(x-i,y-i)$, and outputs a value of "0" when the value of $I_b(x,y)$ does not coincide with the value of $T_b(x-i,y-i)$.

Also in the equation, A denotes the number of pixels found in an area of overlap between the template and the binary registered fingerprint image, and c(i,j) denotes a correlation value when the template is displaced by i of pixels in the horizontal direction and by j of pixels in the vertical direction with respect to the binary registered fingerprint image. Such a correlation value of c(i,j) may take a value in a range from 0 to 1. When a complete coincidence is observed between the template and the binary registered fingerprint image, the correlation value of c(i,j) takes a value of "1". On the other hand, when a complete inversion of image is observed between the template and the binary registered fingerprint image, the correlation value of c(i,j) takes a value of "0".

The high-speed verification section 331 uses the maximum value found in the resulting correlation values c(i,j) as a degree of similarity.

Alternatively, the high-speed verification section 331 may perform pattern matching between the segment of the input fingerprint and the registered fingerprint image without binarization thereof, i.e., uses the segment of the input fingerprint image as a template for pattern matching with the registered fingerprint image. If this is the case, the high-speed verification section 331 calculates a correlation value c'(i,j) between the segment of the input fingerprint image and the registered fingerprint image using the following equation.

Equation 2

$$C^1(i, j) = \frac{\sum_x \sum_y \{(I(x, y) - I_{av})(T(x - i, y - j) - T_{av})\}}{\sqrt{\sum_x \sum_y (I(x, y) - I_{av})^2 \sum_x \sum_y (T(x - i, y - j) - T_{av})^2}} \quad (2)$$

where I(x,y) denotes a value of pixel in the registered fingerprint image with the horizontal coordinate of x and the vertical coordinate of y, and T(x−i,y−j) denotes a value of pixel in the segment of the input fingerprint image with the horizontal coordinate of (x−i) and the vertical coordinate of (y−j). In the equation, Iav denotes an average value of the pixels found in the registered fingerprint image, and Tav denotes an average value of the pixels found in the segment of the input fingerprint image. Herein, i and j respectively denote the displacement amount between the segment of the input fingerprint image and the registered fingerprint image in the horizontal and vertical directions.

Also in the equation, c'(i,j) denotes a correlation value when the segment of the input fingerprint image is displaced by i of pixels in the horizontal direction and by j of pixels in the vertical direction with respect to the registered fingerprint image. Such a correlation value of c'(i,j) may take a value in a range from −1 to 1. When a complete coincidence is observed between the segment of the input fingerprint image and the registered fingerprint image, the correlation value of c'(i,j) takes a value of "1". On the other hand, when a complete inversion of image is observed between the segment of the input fingerprint image and the registered fingerprint image, the correlation value of c'(i,j) takes a value of "−1".

The high-speed verification process to be executed by the high-speed verification section 331 may also be characteristic-point matching. With the characteristic-point matching, a degree of coincidence is checked for between a characteristic point extracted from the segment of the input fingerprint image and a characteristic point extracted from the registered fingerprint image. As an alternative high-speed verification process to be executed by the high-speed verification section 331, for such characteristic-point matching, a degree of coincidence may be checked for between a characteristic point extracted from the segment of the registered fingerprint image and a characteristic point extracted from the input fingerprint image.

In the following, a case is exemplified in which the high-speed verification section 331 extracts characteristic points respectively from the segment of the input image and from the registered fingerprint image. Herein, when the high-speed verification section 331 extracts characteristic points respectively from the segment of the registered image and from the input fingerprint image, the following description is applicable with the term "input fingerprint image" replaced with the term "registered fingerprint image", and vice versa.

In this embodiment, the characteristic point is assumed as being a branch point of a ridge and an end point thereof. The segment of the input fingerprint image is assumed as being an area around the center of the fingerprint therein. An exemplary segment of the input fingerprint image may be an area around the center of the fingerprint therein with a width of about a half of the width of the fingerprint in the lateral direction, and with a length of about one-third of the length of the fingerprint in the vertical direction.

For extraction of a ridge branch point and a ridge end point from the segment of the input fingerprint image, the high-speed verification section 331 binarizes the segment of the input fingerprint image by local thresholding, for example. Herein, such binarization may be performed similarly to the binarization performed for the pattern matching described above. The high-speed verification section 331 then executes a thinning process to the binarized segment of the input fingerprint image. Thereafter, using a plurality of mask patterns, the high-speed verification section 331 scans the segment of the input fingerprint image being the result of thinning, thereby detecting the position of any of the mask patterns showing a match on the input fingerprint image.

The high-speed verification section 331 then extracts, as a characteristic point, a pixel located at the center of the detected position. Note here that the mask patterns are each of a size with 3×3 pixels, and each have a binary pattern corresponding to a ridge branch point and a ridge end point. The high-speed verification section 331 also finds information about the characteristic points, i.e., the positions of the extracted characteristic points, and in which direction the ridge proximal to the characteristic points is directed. For finding out in which direction the ridge proximal to the characteristic points is directed, the high-speed verification section 331 can use any known technology proposed for the purpose.

The high-speed verification section 331 processes also the registered fingerprint image similarly to the segment of the input fingerprint image to extract characteristic points therefrom. The high-speed verification section 331 then also finds information about the characteristic points, i.e., the positions of the extracted characteristic points, and in which direction the ridge proximal to the characteristic points is directed. Herein, alternatively, the high-speed verification section 331 may extract characteristic points from the segment of the input fingerprint image and from the registered fingerprint image using any other known technology of finding a ridge end point or a ridge branch point as each a characteristic point.

Still alternatively, such characteristic point of a registered fingerprint image may be extracted in advance when a fingerprint image of a registered user is registered as a registered fingerprint image. In this case, the storage section 32 may store in advance information about the characteristic points extracted from the registered fingerprint image as such with a correlation with the registered fingerprint image. By storing characteristic points of a registered fingerprint image in advance in the storage section 32 as such, the high-speed verification section 331 becomes able to read information about the characteristic points of the registered fingerprint image from the storage section 32 for use, thereby favorably being able to reduce the time needed for completion of the verification process.

Next, the high-speed verification section 331 selects one of the characteristic points located proximal to the center of the registered fingerprint image and therearound as a first reference characteristic point. The high-speed verification section 331 also selects one of the characteristic points extracted from the segment of the input fingerprint image as a second reference characteristic point. The high-speed verification section 331 then moves parallel the segment of the input fingerprint image to make the second reference characteristic point come exactly on the first reference characteristic point.

Thereafter, while rotating the segment of the input fingerprint image, the high-speed verification section 331 calculates the number of the characteristic points on the registered fingerprint image showing a match with those in the segment of the input fingerprint image. The high-speed verification section 331 repeats such a process by changing the combinations of the first and second reference characteristic points, thereby finding the maximum number of the characteristic points in the registered fingerprint image showing a match with those in the segment of the input fingerprint image.

Lastly, the high-speed verification section 331 divides the value of the maximum number by the value of the total number of the characteristic points extracted from the segment of the input fingerprint image, and the resulting value is used as a degree of similarity. Accordingly, in this case, the degree of similarity takes a value in a range from 0 to 1, and the value of the degree of similarity gets closer to 1 with the higher level of coincidence between the input fingerprint image and the registered fingerprint image.

For detecting any of the characteristic points in the registered fingerprint image showing a match with the characteristic points in the segment of the input fingerprint image, the high-speed verification section 331 checks whether or not there is any characteristic point of the registered fingerprint image in a predetermined range from the position of any of the characteristic points being a target on the input fingerprint image. The predetermined range herein can take a value corresponding to an average space between any two ridges adjacent to each other.

When there is any characteristic point of the registered fingerprint image in such a predetermined range from the position of the target characteristic point, the high-speed verification section 331 finds a difference of angle in the direction of ridges proximal to the characteristic point. When the absolute value of a difference of angle in the direction of such ridges is included in a predetermined angle range, the high-speed verification section 331 determines that the characteristic points in the registered fingerprint image show a match with the target characteristic point in the input fingerprint image.

Herein, the predetermined angle range takes a value corresponding to an allowable limit, with which the direction of a ridge in the vicinity of the target characteristic point is regarded as being directed in the same direction as a ridge in the vicinity of the characteristic point in the registered fingerprint image. Such a predetermined angle range is exemplified as taking a value of 10 (degrees of angle). Alternatively, only when there is any characteristic point of the same type as the target characteristic point in the registered fingerprint image in the predetermined range from the position of the target characteristic point, the high-speed verification section 331 may assess that there is any characteristic point in the registered fingerprint image showing a match with a target characteristic point in the input fingerprint image.

Still alternatively, the high-speed verification section 331 may use any other known technology of finding the number of characteristic points in a registered fingerprint image showing a match with those in a segment of an input fingerprint image.

The high-speed verification section 331 forwards the degree of similarity calculated as above to the processing section 33.

After receiving the degree of similarity from the high-speed verification section 331, the processing section 33 forwards information about completion of the high-speed verification process to the authentication assessment section 333 and the verification history update section 334 together with the degree of similarity being the calculation result by the high-speed verification process.

Similarly to the high-speed verification process executed by the high-speed verification section 331 as such, the precise verification section 332 verifies input biometric information against registered biometric information. Note here that such a verification process to be executed by the precise verification section 332 is executed more precisely than the high-speed verification process for verifying the input biometric information against the registered biometric information, i.e., precise verification process.

The result of such a precise verification process executed by the precise verification section 332 is a degree of similarity of the input biometric information against the registered biometric information. For verifying the input biometric information against the registered biometric information with a higher precision than the high-speed verification process, the precise verification process requires a larger amount of information about the input biometric information or the registered biometric information compared with an amount needed for the high-speed verification process, for example.

As a result, the amount of computation required for the precise verification process to be executed by the precise verification section 332 is larger than the amount of computation required for the high-speed verification process to be executed by the high-speed verification section 331. However, the precise verification section 332 is very likely to be able to use information being less sensitive to any over-time change of the biometric information of the registered user. As such, with execution of the precise verification process, the processing section 33 can increase the authentication success rate compared with when the high-speed verification process is executed.

In this embodiment, the input biometric information is the fingerprint of a log-in-asking user in an input fingerprint image provided by the terminal 2, and the registered biometric information is the fingerprint of a registered user in a registered fingerprint image who is corresponding to identification information of the log-in-asking user. Accordingly, similarly to the high-speed verification process, the precise verification process to be executed by the precise verification section 332 can be pattern matching between a segment of an input fingerprint image and a registered fingerprint image, or pattern matching between a segment of the registered fingerprint image and the input fingerprint image, for example.

In this case, a segment of an input fingerprint image or of a registered fingerprint image for use in the precise verification process are set to be larger than that for use in the high-speed verification process. By setting the segment to be larger as such, with execution of the precise verification process, a larger amount of information about the input biometric information or the registered biometric information can be used than with the high-speed verification process. As an example, a segment of an input fingerprint image for use in the precise verification process may be an area around the center of the fingerprint therein with a width same as the width of the fingerprint in the lateral direction, and with a length of about two-thirds of the length of the fingerprint in the vertical direction.

The fingerprint often shows an over-time change specifically in a partial area thereof, and thus by setting a segment of the fingerprint image for use in pattern matching large, the precise verification section 332 becomes able to use any segment of the fingerprint image showing no or less over-time change for verification. Accordingly, with execution of the precise verification process by the precise verification section 332, the resulting authentication success rate becomes higher than with the high-speed verification process by the high-speed verification section 331. Herein, when the precise verification section 332 also performs pattern matching as a verification process, the precise verification section 332 calculates, using the above equation 1 or 2, a correlation value by changing the position of the segment of the input fingerprint image and the position of the registered fingerprint image.

Alternatively, using the above equation 1 or 2, the precise verification section 332 calculates a correlation value by changing the position of the segment of the registered fingerprint image and the position of the input fingerprint image. The precise verification process 332 uses the maximum value found in the resulting correlation values as a degree of similarity Similarly to the high-speed verification process, the precise verification process to be executed by the precise verification section 332 may also be characteristic-point matching, checking a degree of coincidence for between a characteristic point extracted from a segment of an input fingerprint image and a characteristic point extracted from a registered fingerprint image. Alternatively, the precise verification section 332 may check a degree of coincidence for between a characteristic point extracted from a segment of the registered fingerprint image and a characteristic point extracted from the input fingerprint image.

Also in this case, a segment of an input fingerprint image or of a registered fingerprint image for use in the precise verification process are set to be larger than that for use in the high-speed verification process. By setting the segment to be larger as such, with the precise verification process, a larger amount of information about the input biometric information or the registered biometric information can be used than with the high-speed verification process.

As an example, a segment of an input fingerprint image for use by the precise verification section 332 may be an area around the center of the fingerprint therein with a width same as the width of the fingerprint in the lateral direction, and with a length of about two-thirds of the length of the fingerprint in the vertical direction. Herein, for calculation of a degree of similarity based on a degree of coincidence found between the characteristic points as such, the precise verification section 332 can perform processing to extract characteristic points and to calculate the degree of similarity similarly to the processing performed by the high-speed verification section 331.

Alternatively, for verifying input biometric information against registered biometric information with a higher precision than with the high-speed verification process, the precise verification section 332 may use a larger number of types of characteristics than those used in the high-speed verification process. For the purpose, the precise verification section 332 may execute a characteristic extraction process differently from the characteristic extraction process in the high-speed verification process. Still alternatively, the precise verification section 332 may verify input biometric information against registered biometric information using an algorithm different from that in the high-speed verification process.

In this embodiment, for example, the precise verification section 332 may use, in addition to the information about the characteristic points, i.e., position, direction, and type, information about the relationship between any adjacent characteristic points on the input fingerprint image or on the registered fingerprint image. In this example, such information about the relationship between the characteristic points includes a distance between any two adjacent characteristic points, or the number of ridges or valleys found between any two adjacent characteristic points, for example.

The precise verification section 332 can find the number of ridges or valleys between such two characteristic points as below. That is, on a binarized input fingerprint image or on a binarized registered fingerprint image, the precise verification section 332 scan, in terms of value, such two adjacent pixels along a line segment connecting these pixels, thereby counting the frequency of a change of pixel value between the adjacent pixels from 0 to 1. The precise verification section 332 can use the resulting counted value as the number of ridges or valleys between the two characteristic points. This is surely not restrictive, and the precise verification section 332 may use any other known technology to find the number of ridges or valleys between any two characteristic points.

Also when using information about the relationship between any adjacent characteristic points, as described in the above about the high-speed verification section 331, the precise verification section 332 detects any characteristic point in a registered finger image showing a match with a target characteristic point in an input fingerprint image. Using such information about the relationship between the characteristic points, the precise verification section 332 also assigns a weight to the detection result, i.e., a pair of the target characteristic point in the input fingerprint image and the characteristic point in the registered fingerprint image showing a match therewith, to indicate the degree of coincidence between such characteristic points.

As an example, when detecting a characteristic point in a registered fingerprint image showing a match with a target characteristic point in an input fingerprint image, the precise verification section 332 selects any of the remaining characteristic points in the input fingerprint image showing a match with any characteristic point in the registered fingerprint image, and being located closest to the target characteristic point. The characteristic point selected as such is referred to as an adjacent target characteristic point. The precise verification section 332 then counts the number of ridges between the target characteristic point and the adjacent target characteristic point. The resulting counted number of the ridges is hereinafter referred to as first ridge counted number.

The precise verification section 332 also counts the number of ridges between any of the characteristic points in the registered fingerprint image showing a match with the target characteristic point, and any of the characteristic points in the registered fingerprint image showing a match with the adjacent target characteristic point. The resulting counted number of the ridges is hereinafter referred to as second ridge counted number. When the first ridge counted number is the same as the second ridge counted number, the precise verification section 332 assigns a weight of 1 to the target characteristic point. On the other hand, when the first ridge counted number is not the same as the second ridge counted number, the precise verification section 332 assigns a weight of 0.5 to the target characteristic point.

Alternatively, the precise verification section 332 may assign less weight to the target characteristic point with a larger difference between the first and second ridge counted numbers. The precise verification section 332 sums the weights assigned as such, and divides the resulting sum by the total number of the characteristic points extracted from the input fingerprint image. The resulting value is used as the degree of similarity.

Still alternatively, the precise verification section 332 may perform preprocessing to data representing the input biometric information or data representing the registered biometric information before a verification therebetween, but the high-speed verification section 331 may not perform such preprocessing during the high-speed verification process. Such preprocessing includes processes of edge enhancement, inconsistency correction, contrast correction, intensity adjustment, and noise elimination. With the process of edge enhancement, when data representing the biometric information is a fingerprint image, after a Fourier transform of the fingerprint image, any spatial frequency component corresponding to the cycle of a ridge is enhanced, and then inverse Fourier transform is preformed thereto.

With such preprocessing, an amount of computation is indeed increased, but the precise verification section 332 can enhance the contrast between the ridges and valleys, thereby being able to compensate any change occurred to the biometric information between when it is used to generate input biometric data and when it is input for registration. Accordingly, with such preprocessing performed to the input biometric data or to the registered biometric data, the precise verification section 332 can increase the authentication success rate compared with when no such preprocessing is performed to the data.

As such, when the precise verification section 332 performs preprocessing to the input biometric data or to the registered biometric data, the precise verification process to be executed thereafter may be executed similarly to the high-speed verification process. Alternatively, even for such preprocessing to the input biometric data or to the registered biometric data, as described above, the precise verification section 332 may use a larger amount of information than with the high-speed verification process.

Moreover, when data representing biometric information is a fingerprint image, for example, when verifying input biometric information against registered biometric information, the high-speed verification section 331 and the precise verification section 332 may both use a spatial frequency image as a result of frequency conversion respectively applied to an input fingerprint image and a registered fingerprint image.

The high-speed verification section 331 and the precise verification section 332 then both perform pattern matching between the spatial frequency image of the input fingerprint image and the spatial frequency image of the registered fingerprint image, thereby being able to find the degree of similarity therebetween. Also in this case, by using a larger amount of information than the high-speed verification section 331, the precise verification section 332 executes a verification process with a higher precision than the high-speed verification section 331. For example, the high-speed verification section 331 may apply frequency conversion respectively to a segment of the input fingerprint image and a segment of the registered fingerprint image to find a spatial frequency image of the input fingerprint image and that of the registered fingerprint image. On the other hand, the precise verification section 332 may apply frequency conversion respectively to the entire input fingerprint image and the entire registered fingerprint image to find a spatial frequency image of the input fingerprint image and that of the registered fingerprint image.

The precise verification section 332 forwards the degree of similarity calculated as such to the processing section 33.

After receiving the degree of similarity from the precise verification section 332, the processing section 33 forwards, to the authentication assessment section 333 and the verification history update section 334, the provided degree of similarity being the calculation result by the precise verification process together with information about execution of the precise verification process.

The authentication assessment section 333 compares the value of the degree of similarity calculated by the high-speed verification section 331 or by the precise verification section 332 with a predetermined verification assessment threshold value. When the value of the degree of similarity is larger than the verification assessment threshold value, the authentication assessment section 333 determines that there is a coincidence between the input biometric information and the registered biometric information.

The authentication assessment section 333 then authenticates the user who asks for log-in from the terminal 2 as a registered user whoever corresponding to identification information provided by the log-in-asking user. After authenticating the log-in-asking user as such, the authentication assessment section 333 notifies the authentication result to the processing section 33.

The processing section 33 then executes a log-in process. The processing section 33 also gives permission to the authenticated user to use the computer system 1. For example, the processing section 33 reads individual setting information about the registered user corresponding to the authenticated user from the storage section 32, and forwards the individual setting information to the terminal 2 in use by the authenticated user. The processing section 33 then gives permission for access from the terminal 2 in use by the authenticated user to the storage section 32 of the server 3.

On the other hand, when the value of the degree of similarity is equal to or smaller than the verification assessment threshold value, the authentication assessment section 333 assesses that there is no coincidence between the input biometric information and the registered biometric information. In this case, the authentication assessment section 333 does not authenticate the user who asks for log-in from the terminal 2. The processing section 33 thus terminates the log-in process. The processing section 33 then does not permit the log-in-asking user not authenticated as such to use the computer system 1. For example, the processing section 33 forwards a message about a log-in failure to the terminal 2 in use by the user who asks for log-in, and makes the display section 22 of the terminal 2 display thereon the message about a log-in failure.

The verification assessment threshold value is preferably set to a value with which the authentication assessment section 333 can succeed in authentication only when the user asking for log-in from the terminal 2 has been registered. Similarly, the verification assessment threshold value is preferably set to a value with which the authentication assessment section 333 will fail in authentication when the user asking for log-in from the terminal 2 has not been registered. Such a verification assessment threshold value may take a value derived by multiplying 0.7 to a difference between the maximum and minimum values of the degree of similarity, and by adding the multiplication result to the minimum value of the degree of similarity, for example.

The verification assessment threshold value provided for a comparison with the value of the degree of similarity calculated by the high-speed verification section 331 is not necessarily be the same as the verification assessment threshold value provided for a comparison with the value of the degree of similarity calculated by the precise verification section 332. Especially when the value of the degree of similarity calculated by the high-speed verification process by the high-speed verification section 331 falls within a range different from a range for the value of the degree of similarity calculated by the precise verification process by the precise verification section 332, the verification assessment threshold value is preferably set individually for each of the verification processes.

Such a value setting allows the authentication assessment section 333 to use an appropriate verification assessment threshold value with respect to the respective verification processes. For example, when the degree of similarity calculated by the high-speed verification process takes a value between 0 and 1, the verification assessment threshold value provided for a comparison with the degree of similarity calculated by the high-speed verification process may be 0.7. When the degree of similarity calculated by the precise verification process takes a value between −1 and 1, the verification assessment threshold value provided for a comparison with the degree of similarity calculated by the precise verification process may be 0.4.

Alternatively, the authentication assessment section 333 may convert the degree of similarity calculated by either of the verification processes in accordance with a predetermined conversion algorithm to have a coincidence between a range for the value of the degree of similarity calculated by the verification process and a range for the value of the degree of similarity calculated by the remaining verification process. If this is the case, the authentication assessment section 333 becomes able to use any same verification assessment threshold value for a comparison with the degree of similarity irrespective of which verification process is executed to derive the degree of similarity.

The authentication assessment section 333 notifies the authentication result, i.e., success or failure in authentication, to the processing section 33.

The processing section 33 forwards the authentication result provided by the authentication assessment section 333 as such to the verification history update section 334 or a module or others being in charge of a log-in process in the processing section 33.

Every time the biometric authentication process is executed, the verification history update section 334 records authentication result information indicating the result of the biometric authentication process to a verification history table, which is then stored in the storage section 32. The verification history table is the one correlated with the registered biometric data representing the registered biometric information being a target of the biometric authentication process. The authentication result information exemplarily includes the degree of similarity calculated by the high-speed verification section 331 or by the precise verification section 332, and the authentication result derived by the authentication assessment section 333, i.e., success or failure in authentication.

Herein, there may be a case where the verification process change section 335 (will be described later) uses only either the degree of similarity or the authentication result as an index for a change of the type of the verification process for execution to the registered biometric information. In this case, the authentication result information does not necessarily include both the degree of similarity and the authentication result, but may include only either the degree of similarity or the authentication result whichever is used as such an index. The verification history table is provided for every registered user, and is stored in the storage section 32. Note here that, when the storage section 32 stores the registered biometric data plurally for one register user, the verification history table is provided for each of the registered biometric data, and is stored in the storage section 32.

FIG. 4 is a diagram showing an exemplary verification history table. A verification history table 400 of FIG. 4 is recorded with, on a line basis, the authentication result information about the previous biometric authentication processes. The verification history table 400 includes elements of, in order from a left column, "time and date of verification", "verification process type in use", "degree of similarity", and "authentication result". The element of "time and date of verification" indicates the time and date when the biometric authentication process is executed, and the element of "verification process type in use" indicates values denoting the types of the executed verification process. The element of "degree of similarity" indicates the calculated value of the degree of similarity, and the element of "authentication result" indicates a value denoting the authentication result.

In FIG. 4 example, authentication result information 410 in the second line from the bottom indicates that the biometric authentication process is executed at 9:32 on Jun. 25, 2008. In the line, the element of "verification process type in use" indicates a value of "1" denoting that the type of the executed process is "high-speed". Accordingly, the authentication result information 410 indicates that the high-speed verification process is executed by the high-speed verification section 331 during execution of the biometric authentication process. The authentication result information 410 also indicates that the degree of similarity as a result of the high-speed verification process is 0.65. The element of "authentication result" therein indicates a value of "0" denoting a failure in authentication. The authentication result information 410 thus shows that the biometric authentication process results in a failure.

Similarly, authentication result information 420 in the line at the bottom indicates that the biometric authentication process is executed at 9:35 on Jun. 25, 2008. In the line, the element of "verification process type in use" indicates a value of "2" denoting that the type of the executed verification process is "precise". Accordingly, the authentication result information 420 indicates that the precise verification process is executed by the precise verification section 332 during execution of the biometric authentication process. The authentication result information 420 also indicates that the degree of similarity as a result of the precise verification process is 0.85. The element of "authentication result" therein indicates a value of "1" denoting a success in authentication. The authentication result information 420 thus shows that the biometric authentication process results in a success.

After the completion of the process by the authentication assessment section 333, the verification history update section 334 reads, from the storage section 32, any of the verification history tables of a registered user whose identification information is the same as identification information of a log-in-asking user provided by the terminal 2 and received by the server 3. When the storage section 32 stores the registered biometric data plurally for the registered user, the verification history update section 334 reads, from the storage section 32, any of the verification history tables correlated with the registered biometric information, which is specified not only by the identification information of a log-in-asking user but also by the specification information of the registered biometric information. The verification history update section 334 then additionally provides such authentication result information about the executed biometric authentication process to the verification history table, thereby updating the verification history table. The verification history update section 334 then stores the updated verification history table in the storage section 32.

Whenever required, the verification process change section 335 changes the type of the verification process for execution from one to the other, i.e., from/to the high-speed verification process by the high-speed verification section 331 to/from the precise verification process by the precise verification section 332.

The verification process is generally considered preferable with a less amount of computation. This is because a less amount of computation leads to a shorter time needed for completion of the process so that the user's time of waiting during the log-in process can be reduced, and the load of the server 3 with respect to the processing section 33 can be reduced. Therefore, as a rule, the processing section 33 makes the high-speed verification section 331 execute a verification process that requires a less amount of computation than by the precise verification section 332.

The concern here is that when the biometric information of a registered user is changed over time after the registration into the computer system 1, even if a log-in-asking user has been registered, the degree of similarity to be calculated by the high-speed verification process will take a small value. It means that, with execution of the high-speed verification process, the processing section 33 is very likely to fail in authentication. In consideration thereof, when the authentication success rate for any registered user is assessed as showing an over-time reduction, based on the authentication result information recorded in the verification history table, the verification process change section 335 changes the type of the verification process, i.e., to the precise verification process, for execution to the registered biometric information of the registered user. Accordingly, even if the biometric information of the registered user is changed over time between when it is input for registration and when it is referred to for verification, the processing section 33 can reduce the possibility of resulting in a failure in authentication.

When the server 3 is provided with a log-in request from the terminal 2, the verification process change section 335 reads, from the storage section 32, any of the verification history tables correlated with a registered user whose identification information is the same as identification information of a log-in-asking user provided by the terminal 2. When the storage section 32 stores the registered biometric data plurally for the registered user, the verification process change section 335 reads, from the storage section 32, any of the verification history tables correlated with the registered biometric information, which is specified not only by the identification information of a log-in-asking user but also by the specification information of the registered biometric information.

By referring to the verification history table read as such, the verification process change section 335 assesses whether or not the registered biometric information being a target of the biometric authentication process has been subjected to the high-speed verification process during execution of the last biometric authentication process. When the registered biometric information has been subjected to the high-speed verification process during execution of the last biometric authentication process, the verification process change section 335 calculates a precise assessment value from the authentication result information when the high-speed verification process is executed.

The precise assessment value is assumed as being a statistical amount of the degree of similarity calculated by the high-speed verification process during a most-recent fixed period of time. The precise assessment value is also assumed as being an amount representing a temporal transition of the degree of similarity, or as being an authentication success rate during a most-recent fixed period of time. The statistical amount of the degree of similarity includes an average degree of similarity, a value distribution of the degree of similarity, a standard value deviation of the degree of similarity, and a combination thereof. The amount representing a temporal transition of the degree of similarity includes a value reduction observed in the degree of similarity.

The value reduction observed in the degree of similarity herein means a reduction in terms of average degree of similarity, i.e., a reduction of an average of the values of the degree of similarity calculated during the high-speed verification process executed for a first predetermined number of times within a most-recent fixed period of time from an average of the values of the degree of similarity calculated during the high-speed verification process executed for a last predetermined number of times within the most-recent fixed period of time.

The predetermined number of times may take any value from 1 to 5, and the fixed period of time may be a length of time in which the result of the biometric authentication process can be statistically evaluated, e.g., 10 days, 2 weeks, or a month. This fixed period of time is surely not restrictive to those exemplified, and may be set to be shorter or longer than those. Note that, as an alternative to the result of the biometric authentication process executed during a most-recent fixed period of time, the verification process change section 335 may use the result of the biometric authentication process executed by the high-speed verification section 331 for a predetermined number of times most recently. If this is the case, the predetermined number of times may be set to 10 times or 20 times. However, this is surely not restrictive, and the high-speed verification process may be executed more or less often than those exemplified.

The verification process change section 335 compares such a precise assessment value with a precise assessment threshold value. When assessing that a first change requirement is satisfied as a result of the comparison as such, the verification process change section 335 changes the type of the verification process to "precise" for execution to the registered biometric information being a target of the biometric authentication process. The first change requirement herein is about an over-time reduction of the authentication success rate for a registered user corresponding to the registered biometric information being a target of the biometric authentication process.

On the other hand, when assessing that a first change requirement is not satisfied as a result of the comparison as above, the verification process change section 335 does not change the type of the verification process for execution to the registered biometric information being a target of the biometric authentication process. That is, the processing section 33 continuously executes the high-speed verification process to the registered biometric information.

When the precise assessment value is an average degree of similarity found in a most-recent fixed period of time, the precise assessment threshold value can be the same as a verification assessment threshold value for use in the authentication assessment section 333. Alternatively, when the precise assessment value is the authentication success rate during a most-recent fixed period of time, the precise assessment threshold value can take a minimum value of the allowable authentication success rate, for example. In this case, the precise assessment threshold value can be 0.8, for example. Assuming that the precise assessment threshold value is 0.8 as such, the verification process change section 335 can change the type of the verification process to "precise" before the frequent occurrence of a failure in authentication annoys a user.

Still alternatively, when the precise assessment value is an average degree of similarity or an authentication success rate, if the precise assessment value is smaller than the precise assessment threshold value, the verification process change section 335 assesses that the first change requirement is satisfied. On the other hand, when the precise assessment value is equal to or larger than the precise assessment threshold value, the verification process change section 335 assesses that the first change requirement is not satisfied. As such, the verification process change section 335 can change the type of the verification process to "precise" for execution to any registered user whose authentication success rate is reduced due to the execution of the high-speed verification process.

Note here that when the precise assessment value is an authentication success rate during a most-recent fixed period of time, the verification process change section 335 calculates the authentication success rate by dividing the frequency of a success in authentication owing to the execution of the high-speed verification process within the most-recent fixed period of time by the execution frequency of the high-speed verification process.

In this case, when calculating the execution frequency of the high-speed verification process, the verification process change section 335 may not count any authentication result showing a degree of similarity equal to or lower than an elimination threshold value, which is lower than the verification assessment threshold value. This thus favorably prevents any possible reduction of the authentication success rate that will be caused by any not-registered person pretending himself or herself as a registered user and trying to log-in the computer system so that the correct authentication success rate becomes available for an evaluation. The elimination threshold value is determined as below, for example.

That is, by verifying biometric information of a plurality of no-registered people against the registered biometric information of a registered user, a distribution of the resulting values of the degree of similarity is found experimentally. Hereinafter, such a value distribution is referred to as no-registered-user similarity distribution. Similarly, by verifying the biometric information of a registered user acquired for a plurality of times against the registered biometric information, a distribution of the resulting values of the degree of similarity is found experimentally.

Hereinafter, such a value distribution is referred to as registered-user similarity distribution. Thereafter, a discrimination threshold value between the no-registered-user similarity distribution and the registered-user similarity distribution is found by any method of finding a discrimination threshold value between any two value distributions, e.g., discrimination analysis. The resulting discrimination threshold value is used as an elimination threshold value.

When the precise assessment value is a value distribution of the degree of similarity, the precise assessment threshold value can be set to 0.04 when the value of the degree of similarity is allowed to take a value in a range from 0 to 1, for example. In other words, when the precise assessment value is a standard value deviation of the degree of similarity, the precise assessment threshold value can be set to 0.2. When the value distribution of the degree of similarity is 0.04 or smaller, i.e., when the standard value deviation of the degree of similarity is 0.2 or smaller, even if the high-speed verification process is executed, the processing section 33 can succeed in authentication of any applicable registered user with good stability.

As such, by setting the precise assessment threshold value to 0.04 when it is a value distribution of the degree of similarity, and by setting the precise assessment threshold value to 0.2 when it is a standard value deviation of the degree of similarity, the verification processing change section 335 becomes able to change the type of the verification process to "precise" before the result of the high-speed verification process becomes unsteady. When the precise assessment value is larger than the precise assessment threshold value, i.e., when the degree of similarity largely varies in value, the verification process change section 335 assesses that the first change requirement is satisfied.

On the other hand, when the precise assessment value is equal to or smaller than the precise assessment threshold value, the verification process change section 335 assesses that the first change requirement is not satisfied. Accordingly, the verification process change section 335 can change the type of the verification process to "precise" for execution to the registered biometric information of a registered user whose degree of similarity calculated for every verification process largely varies in value. As such, even for such a registered user, the processing section 33 becomes able to succeed in authentication with good stability.

Furthermore, when the value distribution of the degree of similarity is possibly assumed as being normal, the precise assessment value can take a value calculated by multiplying a standard value deviation of the degree of stability by a predetermined coefficient, and then by subtracting the resulting multiplication value from an average degree of similarity. The precise assessment threshold value can take a value same as the verification assessment threshold value for use by the authentication assessment section 333, for example.

The predetermined coefficient is determined based on how often a failure in authentication for a registered user is tolerable, and is set to any value in a range from 1 to 3, for example. With a lower tolerability against a failure in authentication, the predetermined coefficient is set larger. Assuming that the predetermined coefficient is 3, when the degree of similarity falls short of the verification assessment threshold value by about more than 0.13%, the precise assessment value will be equal to or smaller than the precise assessment threshold value. Also assuming that the predetermined coefficient is 2, when the degree of similarity falls short of the verification assessment threshold value by about more than 2.28%, the precise assessment value will be equal to or smaller than the precise assessment threshold value.

When the precise assessment threshold value is smaller than the precise assessment threshold value, the verification process change section 335 assesses that the first change requirement is satisfied. On the other hand, when the precise assessment threshold value is equal to or larger than the precise assessment threshold value, the verification process change section 335 assesses that the first change requirement is not satisfied. As such, when the percentage of the degree of similarity falling short of the verification assessment threshold value is larger than a predetermined percentage in the high-speed verification process, the verification process change section 335 changes the type of the verification process to "precise", for example. As a result, the processing section 33 thus becomes able to prevent the authentication success rate from being lower than the value of the predetermined percentage.

When the precise assessment value is a value reduction observed in the degree of similarity, the precise assessment threshold value can take a value corresponding to a change of the degree of similarity when the biometric information of a registered user shows a change. In this case, when the biometric information for use in the biometric authentication is a fingerprint, for example, the precise assessment threshold value is determined as below experimentally.

First of all, for a plurality of people experimentally, their fingerprint images are captured by variously changing the state of their fingerprints. From the resulting fingerprint images, the degree of similarity is calculated by the high-speed verification process. An average amount of change observed in the resulting values of the degree of similarity is used as the precise assessment threshold value. Assuming that the degree of similarity calculated as a result of the high-speed verification process shows a change averagely of 0.1 due to the state change of the fingerprints, the precise assessment threshold value will be 0.1. When the precise assessment value is larger than the precise assessment threshold value, i.e., when a value reduction observed in the degree of similarity is large, the verification process change section 335 assesses that the first change requirement is satisfied.

On the other hand, when the precise assessment value is equal to or smaller than the precise assessment threshold value, i.e., when a value reduction observed in the degree of similarity is small, the verification process change section 335 assesses that the first change requirement is not satisfied. Therefore, for any registered user whose degree of similarity shows a large value reduction after the execution of the high-speed verification process, the verification process change section 335 is allowed to change the type of the verification process to "precise" even if the processing section 33 has succeeded in authentication during the biometric authentication process executed most recently. The processing section 33 can thus prevent any possible failure in authentication with respect to such a registered user.

Note here that, when the lapse of time after the registration of specific registered biometric information is not long enough as the fixed period of time described above, the verification process change section 335 may be so configured as not to assess whether or not to change the type of the verification process to the registered biometric information. Alternatively, when the biometric authentication process for specific registered biometric information using the high-speed verification process is not executed often enough as the predetermined number of times described above, the verification process change section 335 may be so configured as not to assess whether or not to change the type of the verification process to the registered biometric information.

Alternatively, the verification process change section 335 may change the type of the verification process for execution depending on the result of the biometric authentication process executed during the last verification. For example, the verification process change section 335 may use a precise assessment value being the degree of similarity as a result of the last verification with execution of the high-speed verification process.

When the degree of similarity as a result of the last verification is equal to or smaller than the verification assessment threshold value, the verification process change section 335 assesses that the first change requirement is satisfied. As an alternative to the degree of similarity as such, the verification process change section 335 may use a precise assessment value being the authentication result in the last verification with execution of the high-speed verification process. If this is the case, when the last verification has resulted in a failure in authentication, the verification process change section 335 assesses that the first change requirement is satisfied.

Alternatively, the verification process change section 335 may assess whether or not to change the type of the verification process to "precise" using a plurality of precise assessment values as described above. For example, when assessing that the first change requirement is satisfied for a predetermined number of the precise assessment values from those others, the verification process change section 335 may change the type of the verification process to "precise", for example. Herein, the predetermined number is an integer of 1 or larger.

The concern here is that, after the component in charge of the verification process is changed from the high-speed verification section 331 to the precise verification section 332, the biometric information of any registered user may be recovered to the state of registration by reason of a change of season, a change of skin dryness, heal of a wound, or others. If this is the case, the authentication success rate for the registered user is very likely increased even if the high-speed verification process is executed again for finding the degree of similarity. Therefore, when the registered biometric information under the execution of the precise verification process is determined as showing an increase of the authentication success rate over time, the verification process change section 335 may change the type of the verification process again to "high-speed" for execution.

For a process change as such, after the server 3 is provide with a log-in request from the terminal 2, the verification process change section 335 reads, from the storage section 32, any of the verification history tables corresponding to a registered user whose identification information is the same as that of a log-in-asking user provided by the terminal 2. When the storage section 32 stores the registered biometric data plurally for the registered user, the verification process change section 335 reads, from the storage section 32, any of the verification history tables correlated with the registered biometric information identified not only by the identification information of the log-in-asking user but also by the specification information of the registered biometric information.

By referring to the verification history table read as such, the verification process change section 335 assesses whether or not the type of the verification process executed in the last verification is "precise" for the registered biometric information being a target of the biometric authentication process. When the type of the precise verification process executed in the last verification is "precise", the verification process change section 335 calculates a high-speed assessment value from the authentication result information as a result of the high-speed verification process as such.

The high-speed assessment value herein is assumed as being the same as the precise assessment value. The high-speed assessment value may be a statistical amount of the degree of similarity or a value increase observed in the degree of similarity calculated in the biometric authentication process in which the precise verification process is executed during a most-recent fixed period of time, for example. The value increase observed in the degree of similarity herein means an increase in terms of average degree of similarity, i.e., an increase of an average of the values of the degree of similarity calculated during the high-speed verification process executed for a first predetermined number of times within a most-recent fixed period of time from an average of the values of the degree of similarity calculated during the high-speed verification process executed for a last predetermined number of times within the most-recent fixed period of time. The predetermined number of times may take any value from 1 to 5.

The high-speed assessment value may be an authentication success rate of the biometric authentication process in which the precise verification process is executed in a most-recent fixed period of time. Note that, as an alternative to the result of the biometric authentication process executed during a most-recent fixed period of time, the verification process change section 335 may use the result of the biometric authentication process executed by the precise verification section 332 for a predetermined number of times most recently.

The verification process change section 335 compares the resulting high-speed assessment value with a high-speed assessment threshold value. When assessing that a second change requirement is satisfied as a result of the comparison as such, the verification process change section 335 changes the type of the verification process again to "high-speed" for execution to the registered biometric information being a target of the biometric authentication process. Note here that the second change requirement herein is about an over-time increase of the authentication success rate for a registered user corresponding to the registered biometric information being a target of the biometric authentication process.

On the other hand, when assessing that the second change requirement is not satisfied as a result of the comparison as above, the verification process change section 335 does not change the type of the verification process for execution to the registered biometric information being a target of the biometric authentication process. That is, the processing section 33 continuously executes the precise verification process to the registered biometric information. Herein, it is considered preferable if the high-speed verification assessment threshold value is set to cause more difficulty in changing the type of verification process again to "high-speed" for execution than in changing that to "precise" for execution. By setting the high-speed assessment threshold value as such, the verification process change section 335 becomes able to reduce any possibility of causing a failure in authentication due to the type change of the verification process again to "high-speed" for execution.

When the high-speed assessment value is an average degree of similarity found in a most-recent fixed period of time, the high-speed assessment threshold value may take a value derived by multiplying the verification assessment threshold value for use in the authentication assessment section 333 by a predetermined safety coefficient, or a value derived by adding a predetermined bias value to the verification assessment threshold value. Herein, the safety coefficient is a value of 1 or larger, e.g., 1.1 or 1.2. The bias value may also be one-tenth or one-twentieth of a difference between the minimum and maximum values possibly derived for the degree of similarity, for example.

When the high-speed assessment value is an authentication success rate during a most-recent fixed period of time, the high-speed assessment threshold value may be derived by adding a predetermined bias value to the minimum value of the allowable authentication success rate. If this is the case, the bias value is 0.1, for example. Moreover, when the high-speed assessment value is an average degree of similarity or an authentication success rate, if the high-speed assessment value is larger than the high-speed assessment threshold value, the verification process change section 335 assesses that the second change requirement is satisfied. On the other hand, when the high-speed assessment value is equal to or smaller than the high-speed assessment threshold value, the verification process change section 335 assesses that the second change requirement is not satisfied.

When the high-speed assessment value is a value distribution of the degree of similarity, the high-speed assessment threshold value can be set to 0.0225 when the value of the degree of similarity is allowed to take a value in a range from 0 to 1, for example. In other words, when the high-speed assessment value is a standard value deviation of the degree of similarity, the high-speed assessment threshold value can be set to 0.15. In this case, when the high-speed assessment value is smaller than the high-speed assessment threshold value, i.e., when the degree of similarity does not vary in value that much, the verification process change section 335 assesses that the second change requirement is satisfied. On the other hand, when the high-speed assessment value is equal to or larger than the high-speed assessment threshold value, the verification process change section 335 assesses that the second change requirement is not satisfied.

Furthermore, when the value distribution of the degree of similarity is possibly assumed as being normal, the high-speed assessment value can take a value calculated by multiplying a standard value deviation of the degree of similarity by a predetermined coefficient, and then by subtracting the resulting multiplication value from an average degree of similarity. The high-speed assessment threshold value can take a value derived by multiplying the verification assessment threshold value for use in the authentication assessment section 333 by a predetermined safety coefficient, or a value derived by adding a predetermined bias value to the verification assessment threshold value, for example.

Herein, the safety coefficient and the bias value may be both set similarly to a case where the high-speed assessment value is an average degree of similarity calculated within a most-recent fixed period of time. The predetermined coefficient is determined based on how often a failure in authentication for a registered user is tolerable, and is set to any value in a range from 1 to 3, for example. When the high-speed assessment value is larger than the high-speed assessment threshold value, the verification process change section 335 assesses that the second change requirement is satisfied. On the other hand, when the high-speed assessment value is equal to or smaller than the high-speed assessment threshold value, the verification process change section 335 assesses that the second change requirement is not satisfied.

When the high-speed assessment value is a value increase observed in the degree of similarity, the high-speed assessment threshold value can take a value derived by multiplying the precise assessment threshold value to be set when the precise assessment value is a value reduction observed in the degree of similarity by a predetermined safety coefficient. In this case, the safety coefficient is a positive value of 1 or larger, e.g., 1.1. When the high-speed assessment value is larger than the high-speed assessment threshold value, i.e., when a value increase is observed in the degree of similarity, the verification process change section 335 assesses that the second change requirement is satisfied. On the other hand, when the high-speed assessment value is equal to or smaller than the high-speed assessment threshold value, the verification process change section 335 assesses that the second change requirement is not satisfied.

As a result of any of the above-described assessment processes, when determining to change the type of the verification process to "high-speed" for execution, the verification process change section 335 may execute both the high-speed verification process and the precise verification process. When the authentication assessment section 333 succeeds in authentication using the degree of similarity calculated as a result of the high-speed verification process, the verification process change section 335 changes the type of the verification process again to "high-speed" for execution to the registered biometric information being a target of the next biometric authentication process and thereafter.

On the other hand, when the authentication assessment section 333 fails in authentication using the degree of similarity calculated as a result of the high-speed verification process, the verification process change section 335 does not change the type of the verification process for execution to the registered biometric information being a target of the next biometric authentication process and thereafter, i.e., the verification process remains "precise". Note here that when the authentication assessment section 333 fails in authentication using the degree of similarity calculated as a result of the high-speed verification process, for the current verification process, the authentication assessment section 333 uses the authentication result being the degree of similarity calculated by the precise verification process. As such, before actually changing the type of the verification process again to "high-speed" for execution, the verification process change section 335 checks, as a try, to see whether executing the high-speed verification process will indeed lead to a success in authentication. Such a check of the correctness of executing the high-speed verification process again favorably prevents a failure in authentication from occurring.

The verification process change section 335 notifies the processing section 33 of information about the type of the verification process for execution.

Alternatively, the verification process change section 335 may assess whether or not to change the type of the verification process for execution at the timing other than when the server 3 is provided with a log-in request from the terminal 2. For example, after a verification process is executed in response to a log-in request provided by the terminal 2 to the server 3, the verification process change section 335 may assess whether or not to change the type of the verification process for execution in the next biometric authentication process and thereafter. Still alternatively, the verification process change section 335 may assess whether or not to change the type of the verification process for execution during certain time periods with not many users, e.g., when the computer system 1 is activated or terminated, or at nighttime.

When the verification process change section 335 assesses whether or not to change the type of the verification process for execution at the timing other than when the server 3 is provided with a log-in request, a reference table is stored in the storage section 32. The reference table here is the one storing flags indicating the types of the verification process on a basis of the registered biometric information. As such, every time assessing whether or not to change the type of the verification process for execution, the verification process change section 335 updates the reference table in accordance with the result of the assessment made to each of the registered biometric information. On the other hand, when the server 3 is provided with a log-in request from the terminal 2, by referring to such a reference table, the processing section 33 determines the type of the verification process for execution to the registered biometric information of any registered user whose identification information is the same as the identification information of a log-in-asking user provided by the terminal 2.

FIG. 5 is a diagram showing an exemplary reference table indicating which type of the verification process is to be executed on the basis of the registered biometric information. A reference table 500 of FIG. 5 is recorded with, on a line basis, verification process information about the registered biometric information. The reference table 500 includes elements of, in order from a left column, "registered user identification information", and "verification process type in use". The element of "registered user identification information" indicates identification information about each registered user, and the element of "verification process type in use" indicates flags denoting the types of the verification process for execution.

In this reference table 500 in FIG. 5 as an example, the flag in the element of "verification process type in use" indicates a value of "1" when the type of the verification process for execution is "high-speed", and indicates a value of "2" when the type of the verification process for execution is "precise". As such, in the reference table 500, for example, verification process information 510 in the top line indicates that the type of the verification process for execution is "high-speed". Also in the reference table 500, verification process information 520 in the second line from the top indicates that the type of the verification process for execution is "precise". Note here that when the storage section 32 stores the registered biometric data plurally for one registered user, the reference table 500 indicates not only the identification information of the registered users and the flags denoting the types of the verification process but also specific information about registered biometric information.

Figure 6:
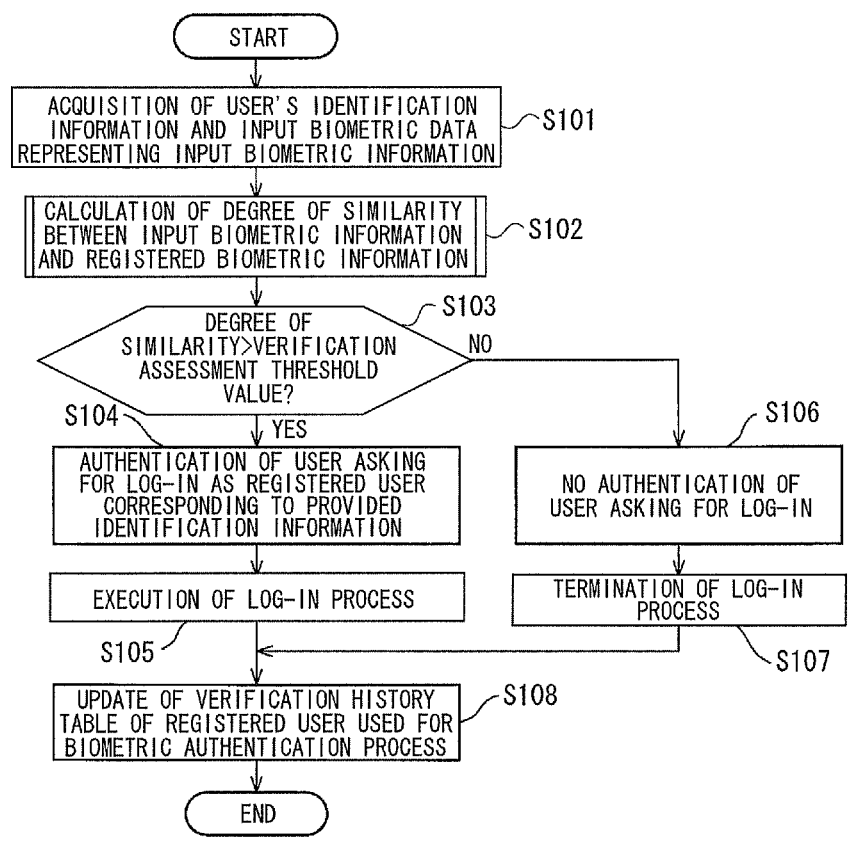
FIG. 6 is a flowchart of the operation of a biometric authentication process to be executed in the server of the first embodiment.

FIG. 6 is an operation flowchart of a biometric authentication process following a computer program to be run by the processing section 33 of the server 3.

As shown in FIG. 6, first of all, when a log-in request is provided from the terminal 2 to the server 3, from the terminal 2, the processing section 33 acquires identification information of a user who is asking for log-in and input biometric data representing input biometric information about the log-in-asking user (Operation S101). Next, the processing section 33 verifies the input biometric information against registered biometric information of any registered user corresponding to the input biometric information. Such verification is made by executing a high-speed verification process by the high-speed verification section 331 or a precise verification process by the precise verification section 332. Herein, the registered biometric information corresponding to the input biometric information is specified by the identification information about the log-in-asking user. The processing section 33 then calculates a degree of similarity between the input biometric information and the registered biometric information (Operation S102). Note that such a calculation of the degree of similarity will be described later by referring to FIG. 7.

The processing section 33 then forwards, to the authentication assessment section 333 and the verification history update section 334 in the processing section 33, the degree of similarity calculated by the high-speed verification section 331 or by the precise verification section 332 together with information about the type of the executed verification process.

After operation S102, the authentication assessment section 333 assesses whether or not the calculated degree of similarity is larger than a verification assessment threshold value (operation S103). When the degree of similarity is larger than the verification assessment threshold value (operation S103: Yes), the authentication assessment section 333 assesses that the input biometric information coincides with the registered biometric information.

The authentication assessment section 333 then authenticates the user who asks for log-in from the terminal 2 as a registered user corresponding to the identification information provided by the log-in-asking user (operation S104). The authentication assessment section 333 then notifies the authentication result to the processing section 33. The processing section 33 then forwards the authentication result provided by the authentication assessment section 333 to the verification history update section 334. After the completion of the user authentication as such, the processing section 33 accordingly executes a log-in process (operation S105). The processing section 33 then gives permission to the authenticated user to use the computer system 1. For giving permission as such, the processing section 33 reads individual setting information of the registered user corresponding to the authenticated user from the storage section 32, and forwards the individual setting information to the terminal 2 in use by the authenticated user.

On the other hand, when the calculated degree of similarity is equal to or smaller than the verification assessment threshold value (operation S103: No), the authentication assessment section 333 assesses that there is no coincidence between the input biometric information and the registered biometric information. In this case, the authentication assessment section 333 does not authenticate the user who asks for log-in from the terminal 2 (operation S106). The authentication assessment section 333 then notifies the authentication result to the processing section 33. The processing section 33 then forwards the authentication result provided by the authentication assessment section 333 to the verification history update section 334. The processing section 33 also terminates the log-in process (operation S107). That is, the processing section 33 does not permit the log-in-asking user not authenticated as such to use the computer system 1. Thereafter, the processing section 33 forwards a message about a log-in failure to the terminal 2 in use by the user who asks for log-in, and makes the display section 22 of the terminal 2 display thereon the message about a log-in failure, for example.

After operation S105 or S107, based on the degree of similarity and the authentication result provided by the processing section 33, the verification history update section 334 in the processing section 33 updates a verification history table corresponding to the registered biometric information used for the biometric authentication process (operation S108). The processing section 33 then stores thus updated verification history table in the storage section 32. Thereafter, the processing section 33 ends the biometric authentication process.

Figure 7:
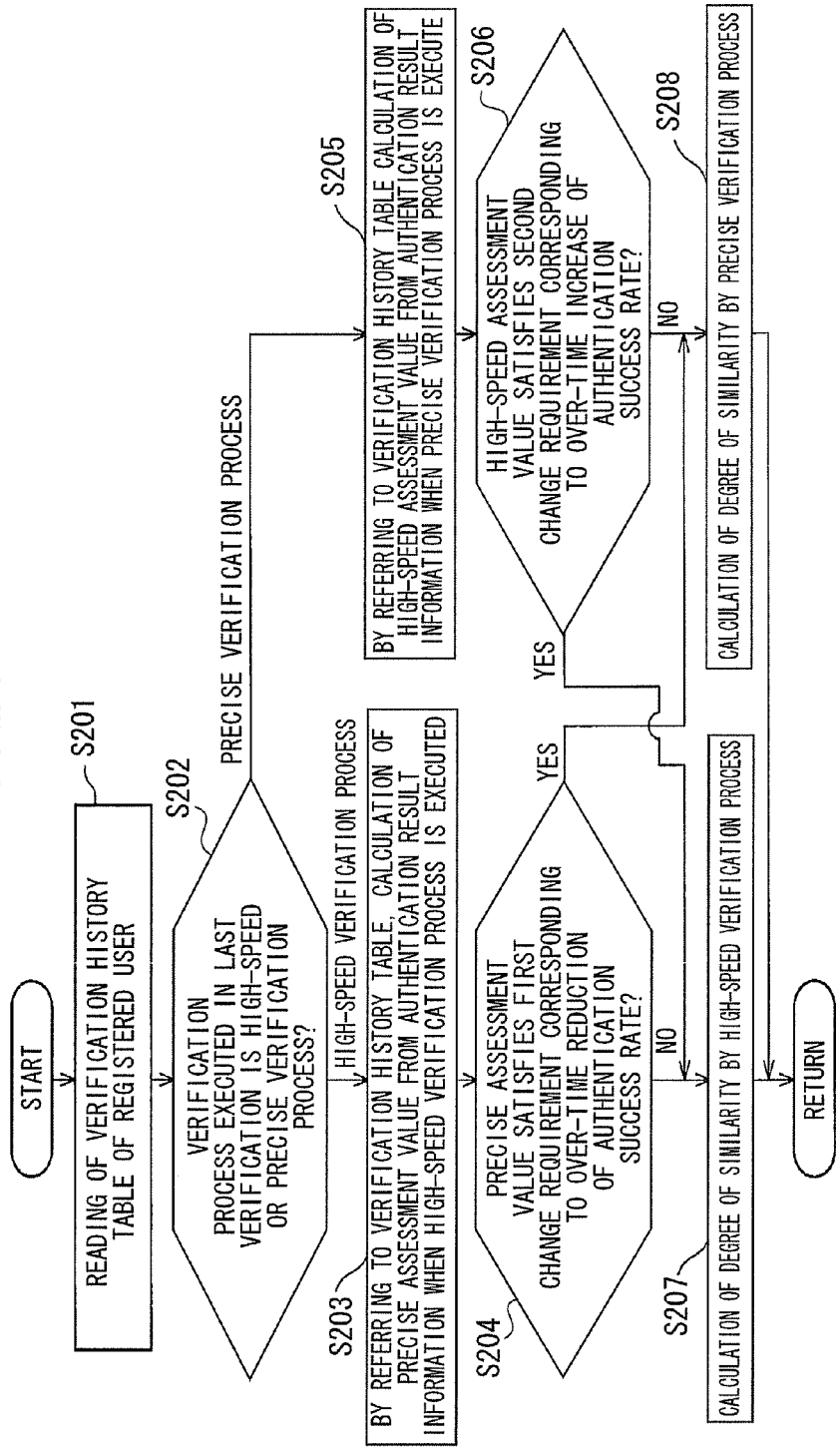
FIG. 7 is a flowchart of a process of calculating the degree of similarity.

In the following, by referring to FIG. 7, calculating the degree of similarity is described. The verification process change section 335 in the processing section 33 reads, from the storage section 32, a verification history table of a registered user whose identification information is the same as that acquired about a user asking for log-in (operation S201). When the storage section 32 stores the registered biometric data plurally for the registered user, the verification process change section 335 reads, from the storage section 32, any of the verification history tables correlated with the registered biometric information identified not only by the identification information about the log-in-asking user but also by specification information of the registered biometric information.

By referring to the verification history table read as such, the verification process change section 335 then specifies which type of the verification process, i.e., "high-speed" or "precise", is executed to the registered biometric information being a target in the last biometric authentication process (operation S202). In operation S202, when the executed verification process is specified as "high-speed", the verification process change section 335 refers to the verification history table to calculate a precise assessment value from the authentication result information when the high-speed verification process is executed (operation S203).

The verification process change section 335 then assesses whether or not the precise assessment value satisfies a first change requirement (operation S204). The first change requirement herein is about an over-time reduction of the authentication success rate for the registered biometric information. When assessing that the first change requirement is not satisfied (operation S204: No), the verification process change section 335 notifies the processing section 33 to execute the high-speed verification process.

The processing section 33 then reads, from the storage section 32, any of the registered biometric data representing the registered biometric information of the registered user being a target for verification. With the high-speed verification process executed, the processing section 33 calculates the degree of similarity between the input biometric information and the registered biometric information (operation S207). The processing section 33 then forwards, to the authentication assessment section 333 and the verification history update section 334, the degree of similarity calculated as such with the high-speed verification process executed. On the other hand, when assessing that the first change requirement is satisfied (operation S204: Yes), the verification process change section 335 notifies the processing section 33 to execute the precise verification process.

The processing section 33 then reads, from the storage section 32, any of the registered biometric data indicating the registered biometric information of the registered user being a target for verification. With the precise verification process executed, the processing section 33 then calculates the degree of similarity between the input biometric information and the registered biometric information (operation S208). The processing section 33 then forwards, to the authentication assessment section 333 and the verification history update section 334, the degree of similarity calculated with the precise verification process executed as such.

In operation S202, when the type of the verification process executed in the last biometric authentication process is "precise", the verification process change section 335 refers to the verification history table to calculate a high-speed assessment value from the authentication result information when the precise verification process is executed (operation S205).

The verification process change section 335 then assesses whether or not the high-speed assessment value satisfies a second change requirement (operation S206). The second change requirement herein is about an over-time increase of the authentication success rate for the registered biometric information. When assessing that the second change requirement is not satisfied (operation S206: No), the verification process change section 335 notifies the processing section 33 to execute the precise verification process.

The processing section 33 then reads, from the storage section 32, any of the registered biometric data representing the registered biometric information of the registered user being a target for verification. With the precise verification process executed, the processing section 33 calculates the degree of similarity between the input biometric information and the registered biometric information (operation S208). The processing section 33 then forwards, to the authentication assessment section 333 and the verification history update section 334, the degree of similarity calculated as such with the precise verification process executed as such.

On the other hand, when assessing that the second change requirement is satisfied (operation S206: Yes), the verification process change section 335 notifies the processing section 33 to execute the high-speed verification process. The processing section 33 then reads, from the storage section 32, any of the registered biometric data indicating the registered biometric information of the registered user being a target for verification. With the high-speed verification process executed, the processing section 33 then calculates the degree of similarity between the input biometric information and the registered biometric information (operation S207). The processing section 33 then forwards, to the authentication assessment section 333 and the verification history update section 334, the degree of similarity calculated with the high-speed verification process executed as such.

Note here that, when the verification process change section 335 assesses which type of the verification process is executed at the timing other than when the server 3 is provided with a log-in request, the processing section 33 may skip the processes in operations S202 to S206 described above. If this is the case, as alternatives to the processes in operations S202 to S206, the processing section 33 determines the type of the verification process for execution by referring to such a reference table as shown in FIG. 5.

In operation S203, when the verification process change section 335 cannot calculate a precise assessment value for the registered biometric information being a target for verification, the processing section 33 may execute the process in operation S207 without making such an assessment as in operation S204. Note that, if a period of time during the biometric authentication process executed by the high-speed verification process is not long enough as the described-above fixed period of time for calculating the precise assessment value, it means that the verification process change section 335 may not be able to calculate the precise assessment value. Similarly, in operation S205, if the verification process change section 335 cannot calculate the high-speed assessment value for the registered biometric information being a target for verification, the processing section 33 may execute the process in operation S208 without making such an assessment as in operation S206.

Moreover, when the registered biometric information being a target for verification is used in the biometric authentication process for the first time, the processing section 33 executes the process in operation S207 without executing the processes in operations S202 to S206 described above. That is, the processing section 33 calculates the degree of similarity between the input biometric information and the registered biometric information with the high-speed verification process executed.

As described in the foregoing, the computer system of the first embodiment adopting the biometric authentication device or method of the invention executes, as a rule, a high-speed verification process requiring a relatively less amount of computation when a user asks for log-in thereto. The computer system thus can reduce the processing time needed for completion of a biometric authentication process. Moreover, the computer system checks whether or not an authentication success rate for a registered user shows an over-time reduction based on the history of the results of the previous biometric authentication processes in which the high-speed verification process is executed.

When the authentication success rate is determined as showing an over-time reduction for the registered user, the computer system instead executes a precise verification process for verifying input biometric information against registered biometric information to make verification with a higher precision than with the high-speed verification process. As such, the computer system selectively executes the precise verification process only to any registered user suffering an over-time reduction of the authentication success rate as a result of execution of the high-speed verification process. Accordingly, such a computer system can prevent any possible reduction of the authentication success rate also to any registered user whose biometric information shows an over-time change compared with when it is registered while preventing an increase of the processing time needed for completion of a verification process.

The computer system also uses the history of the results of the previous biometric authentication processes in which the precise verification process is executed to check whether or not the authentication success rate for the registered user shows an over-time increase. When the authentication success rate is determined as showing an over-time increase for the registered user, the computer system changes the type of the verification process again to "high-speed" for execution to the registered biometric information of the registered user. As such, even for any registered user whose verification process has taken longer, if his or her biometric information is recovered to its initial state at the time of registration, the computer system can reduce the processing time again needed for completion of the verification process without causing a reduction of the authentication success rate.

Next, described is a computer system in a second embodiment adopting the biometric authentication device or method of the invention.

Compared with the computer system of the first embodiment, the computer system of the second embodiment has a difference of sequentially verifying input biometric information against registered biometric information of every registered user during a verification process. As such, the computer system of the second embodiment does not require identification information of a log-in-asking user for use to specify which registered biometric information is a target for verification in the verification process.

Instead of using the identification information as such, the computer system of the second embodiment correlates the result of a biometric authentication process failed in authentication with any of the registered users who is most likely to be the log-in-asking user, thereby aiming to correctly evaluate the result of the biometric authentication process executed to each of the registered users. Accordingly, the computer system of the second embodiment can select appropriately the type of the verification process for execution to the registered users.

Similarly to the computer system of the first embodiment, the computer system 1 of the second embodiment is of the configuration same as that of FIG. 1. That is, as shown in FIG. 1, the computer system 1 of the second embodiment is also configured to include three terminals 2 and at least one server 3, which are connected together over the communications network 4. Herein, the number of the terminals 2 in the computer system 1 of the second embodiment is surely not restrictive to 3, and the number of the servers 3 therein is also not restrictive to 1. The terminals 2 in the computer system 1 of the second embodiment are each of the configuration similar to that of FIG. 1.

Note here that the terminal 2 does not require an input of identification information about a user asking for log-in to the computer system 1. After a log-in-asking user operates the input section 21 for log-in, for example, the terminal 2 generates input biometric data, i.e., an input fingerprint image of the user's fingerprint captured by the biometric information input section 23. The terminal 2 then forwards the resulting input biometric data to the server 3 together with a log-in equation request signal.

Also the server 3 in the computer system 1 of the second embodiment is of the configuration similar to that of the server 3 in the computer system 1 of the first embodiment. That is, as shown in FIG. 2, the server 3 in the computer system 1 of the second embodiment is also configured to include the communications section 31, the storage section 32, and the processing section 33. However, a biometric authentication process to be executed by the processing section 33 in the server 3 in the second embodiment is executed differently from the one in the first embodiment. Therefore, in the following, such a different biometric authentication process to be executed by the processing section 33 in the server 3 is described. For the remaining configuration of the computer system 1 of the second embodiment, the description about the computer system 1 of the first embodiment is referred to.

Figure 8:
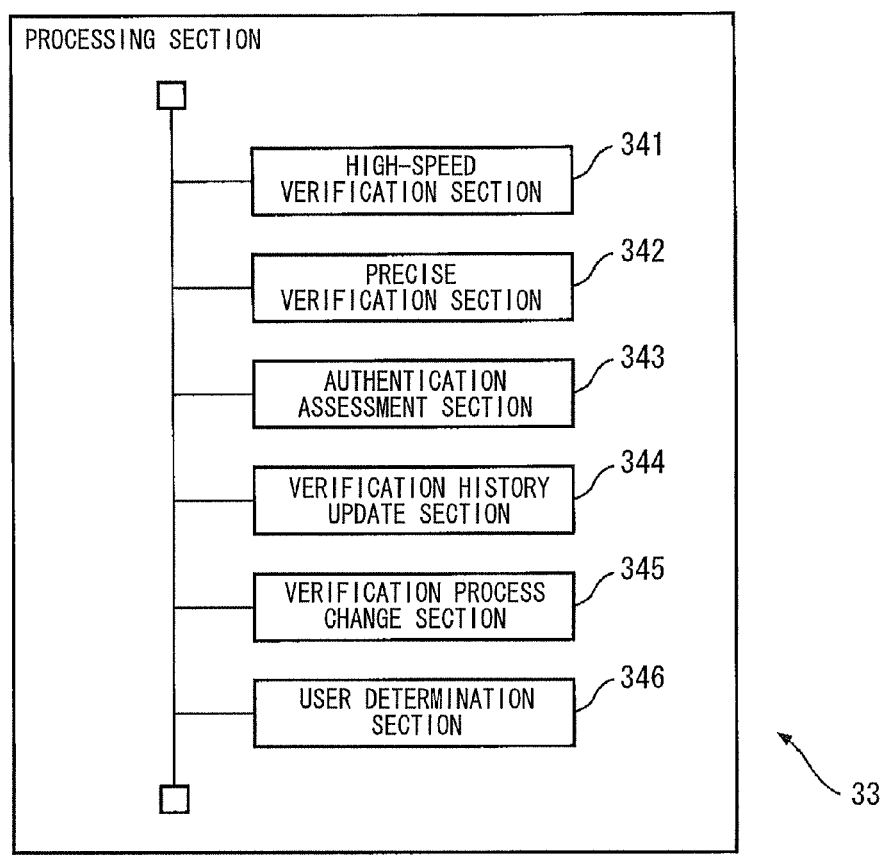
FIG. 8 is a sectional block diagram in a server, showing sections to be implemented for executing a biometric authentication process to a user in a second embodiment.

FIG. 8 is a sectional block diagram of the processing section 33 in the server 3, showing the sections to be implemented for execution of a biometric authentication process to a log-in-asking user. As shown in FIG. 8, the processing section 33 is configured to include a high-speed verification section 341, a precise verification section 342, an authentication assessment section 343, a verification history update section 344, a verification process change section 345, and a user determination section 346. These components in the processing section 33 are sectional modules to be implemented by a program to be run on a processor provided in the processing section 33. Alternatively, these components in the processing section 33 may be implemented in the server 3 as firmware.

By executing a high-speed verification process, the high-speed verification section 341 sequentially verifies input biometric information against registered biometric information. The input biometric information is the one included in input biometric data provided by the terminal 2, and the registered biometric information is the one included in registered biometric data about every registered user stored in the storage section 32. The high-speed verification section 341 then calculates a degree of similarity of the input biometric information against the registered biometric information as a result of the high-speed verification process. Herein, the high-speed verification process to be executed by the high-speed verification section 341 is assumed as being the same as that executed by the high-speed verification section 331 in the processing section 33 of the first embodiment. Therefore, no detailed description about the high-speed verification process to be executed by the high-speed verification section 341 is provided again.

The high-speed verification section 341 forwards the calculated degree of similarity to the processing section 33.

Every time the degree of similarity is provided by the high-speed verification section 341, the processing section 33 forwards, to the authentication assessment section 343, the degree of similarity provided by the high-speed verification section 341 as such together with information about the execution of the high-speed verification process, and identification information about any of the registered users corresponding to the registered biometric information used for the verification.

By executing a precise verification process, the precise verification section 342 sequentially verifies input biometric information against registered biometric information. The input biometric information is the one included in input biometric data provided by the terminal 2, and the registered biometric information is the one included in registered biometric data about every registered user stored in the storage section 32. The precise verification section 342 then calculates a degree of similarity of the input biometric information against the registered biometric information as a result of the precise verification process.

Herein, similarly to the precise verification section 332 in the processing section 33 of the first embodiment, the precise verification section 342 uses a larger amount of information about the biometric information than the high-speed verification section 341. Accordingly, the amount of computation in the precise verification process to be executed by the precise verification section 342 is larger than that in the high-speed verification process to be executed by the high-speed verification section 341. On the other hand, the precise verification section 342 is very likely to be able to use, for a verification process, any portion of the biometric information of a registered user showing less over-time change, i.e., either the input biometric information or the registered biometric information whichever showing less difference from the other. As such, with the precise verification process executed, the processing section 33 can increase an authentication success rate than a value thereof when the high-speed verification process is executed.

Herein, the precise verification process to be executed by the precise verification section 342 is assumed as being the same as that to be executed by the precise verification section 332 in the processing section 33 of the first embodiment. Therefore, no detailed description about the precise verification process is provided again.

The precise verification section 342 forwards the calculated degree of similarity to the processing section 33.

Every time the degree of similarity is provided by the precise verification section 342, the processing section 33 forwards, to the authentication assessment section 343, the degree of similarity provided by the precise verification section 342 as such together with information about the execution of the precise verification process, and identification information about any of the registered users corresponding to the registered biometric information used for the verification.

Every time receiving the degree of similarity calculated as a result of the high-speed verification process or the precise verification process together with the identification information of any of the registered users corresponding to the degree of similarity, the authentication assessment section 343 sequentially compares the provided degree of similarity with a predetermined verification assessment threshold value. Herein, the verification assessment threshold value is determined similarly to the verification assessment threshold value for use in the authentication assessment section 333 in the processing section 33 of the first embodiment.

When assessing that the degree of similarity is larger than the verification assessment threshold value, the authentication assessment section 343 assesses that there is a coincidence between the input biometric information and the registered biometric information. The authentication assessment section 343 then authenticates the user who asks for log-in from the terminal 2 as a registered user corresponding to the registered biometric information assessed as showing a coincidence with the input biometric information. The authentication assessment section 343 then notifies the processing section 33 of the authentication result indicating a success in authentication.

After the authentication assessment section 343 authenticates the log-in-asking user as such, the processing section 33 executes a log-in process. The processing section 33 then gives permission to the authenticated user to use the computer system 1. For giving permission as such, the processing section 33 reads individual setting information of any of the registered users corresponding to the authenticated user from the storage section 32, and forwards the individual setting information to the terminal 2 in use by the authenticated user, for example.

On the other hand, when the provided degree of similarity is equal to or smaller than the verification assessment threshold value, the authentication assessment section 343 determines that there is no coincidence between the input biometric information and the registered biometric information. In this case, the authentication assessment section 343 will use another incoming value of the degree of similarity for a comparison with the verification assessment threshold value as such. Then, until the input biometric information is assessed as coinciding with any of the registered biometric information, the authentication assessment section 343 repeats such a comparison between the values of the degree of similarity provided by the processing section 33 with the verification assessment threshold value.

When all of the values of the degree of similarity calculated for the registered biometric information of every registered user are equal to or smaller than the verification assessment threshold value, the authentication assessment section 343 does not authenticate the user who asks for log-in from the terminal 2. The authentication assessment section 343 thus notifies the processing section 33 of the authentication result indicating a failure in authentication. In this case, the processing section 33 terminates the log-in process. The processing section 33 then does not permit the log-in-asking user authenticated as such to use the computer system 1. For example, the processing section 33 forwards a message about a log-in failure to the terminal 2 in use by the user who asks for log-in, and makes the display section 22 of the terminal 2 display thereon the message about a log-in failure.

When the authentication assessment section 343 does not authenticate the log-in-asking user, the user determination section 346 finds a maximum degree of similarity from the provided values thereof for use as an index for assessing whether or not the log-in-asking user corresponds to any of the registered user. Herein, there may be a case where the values of the degree of similarity calculated by the high-speed verification process may fall within a range different from a range for the values of the degree of similarity calculated by the precise verification process.

If this is the case, the authentication assessment section 334 converts the values of the degree of similarity calculated by either of the verification processes in accordance with a predetermined conversion algorithm to have a match between a range for the values of the degree of similarity calculated by one type of the verification process and a range for the values of the degree of similarity calculated by the other type of the verification process. Using the resulting values of the degree of similarity through with such a conversion, the authentication assessment section 343 determines a maximum degree of similarity. The authentication assessment section 343 then forwards the resulting maximum degree of similarity to the processing section 33.

Instead of sequentially comparing the values of the degree of similarity provided by the processing section 33 against the verification assessment threshold value as such, the authentication assessment section 343 may find a maximum degree of similarity from the provided values thereof. If this is the case, the authentication assessment section 343 compares only the maximum degree of similarity with the verification assessment threshold value.

Moreover, as described above, there may be a case where the values of the degree of similarity calculated by the high-speed verification process may fall within a range different from a range for the values of the degree of similarity calculated by the precise verification process. If this is the case, the authentication assessment section 343 converts the degree of similarity calculated by either of the verification processes in accordance with a predetermined conversion algorithm to have a match between a range for the values of the degree of similarity calculated by one type of the verification process and a range for the values of the degree of similarity calculated by the other type of the verification process. Using the resulting values of the degree of similarity through with such a conversion, the authentication assessment section 343 determines a maximum degree of similarity.

When the maximum value of the degree of similarity is larger than the verification assessment threshold value, the authentication assessment section 343 assesses that there is a coincidence between the input biometric information and the registered biometric information corresponding to the maximum degree of similarity. The authentication assessment section 343 then authenticates the user who asks for log-in from the terminal 2 as a registered user corresponding to the registered biometric information. The authentication assessment section 343 then notifies the processing section 33 of the authentication result indicating a success in authentication. After the authentication assessment section 343 authenticates the log-in-asking user as such, the processing section 33 executes a log-in process.

On the other hand, when the maximum degree of similarity is equal to or smaller than the verification assessment threshold value, the authentication assessment section 343 assesses that there is no coincidence between the input biometric information and the registered biometric information corresponding to the maximum degree of similarity. In this case, the authentication assessment section 343 does not authenticate the user who asks for log-in from the terminal 2. The authentication assessment section 343 then notifies the processing section 33 of the authentication result indicating a failure in authentication. In this case, the processing section 33 terminates the log-in process.

When the authentication assessment section 343 authenticates the user who asks for log-in as any of the registered users, the processing section 33 forwards his or her identification information to the verification history update section 344 together with the authentication result information.

On the other hand, when the authentication assessment section 343 does not authenticate the user who asks for log-in, the processing section 33 forwards, to the user determination section 346, the maximum degree of similarity together with the identification information of any of the registered users corresponding to the maximum degree of similarity.

For the registered biometric information of each of the registered users, the verification process change section 345 refers to the verification history tables stored in the storage section 32 to assess whether or not to change the type of the verification process for execution from/to the high-speed verification process by the high-speed verification section 341 to/from the precise verification process by the precise verification section 342. In accordance with the result of such an assessment, the verification process change section 345 selects either the high-speed verification process or the precise verification process for execution to each of the registered biometric information.

The verification process change section 345 then notifies the selection result to the processing section 33. The processing section 33 thus executes the verification process of the type selected by the verification process change section 345 as such whenever expected. Herein, the process to be executed by the verification process change section 345 is the same as that to be executed by the verification process change section 345 in the processing section 33 of the first embodiment. Similarly, the verification history tables to be stored in the storage section 32 are also the same as those used in the first embodiment. Therefore, no detailed description about the process to be executed by the verification process change section 345 is provided again.

When the user who asks for log-in is not authenticated, the user determination section 346 assesses whether or not the log-in-asking user is any of the registered users. With biometric authentication, there is a characteristic that the degree of similarity between registered biometric information of a registered user and input biometric information of the registered user is generally higher in value than the degree of similarity between registered biometric information of a registered user and input biometric information of anyone not registered. Such a characteristic is satisfied even if the degree of similarity between registered biometric information of a registered user and input biometric information of the registered user is equal to or smaller than the verification assessment threshold value.

In consideration thereof, the user determination section 346 compares the maximum degree of similarity provided by the processing section 33 with a user determination threshold value. When the maximum degree of similarity is higher than the user determination threshold value, the user determination section 346 assesses that the user who asks for log-in is any of the registered users corresponding to the maximum degree of similarity. On the other hand, when the maximum value of the degree of similarity is equal to or smaller than the user determination threshold value, the user determination section 346 assesses that the user who asks for log-in is not registered.

Herein, the user determination threshold value is smaller than the verification assessment threshold value for use by the authentication assessment section 343. The user determination threshold value is set to such a value as being able to prevent any erroneous assessment, i.e., a non-registered person is assessed as being a registered user in the computer system 1. The user determination threshold value is determined similarly to the elimination threshold value described in the first embodiment about the verification process change section 335 in the processing section 33, for example.

As such, even when the user who asks for log-in is not authenticated based on the maximum degree of similarity as a result of the verification process, the user determination section 346 assesses whether or not the log-in-asking user is any of the registered users corresponding to the maximum degree of similarity. Accordingly, the user determination section 346 enables to correlate the result of the biometric authentication process executed to the not-authenticated log-in-asking user to any of the registered users.

Note here that when the biometric information of any registered user shows a small over-time change from when it is registered, the degree of similarity to be calculated by a verification process executed with the input biometric information being the biometric information of the registered user becomes higher. As such, the processing section 33 is less likely to fail in authentication of the registered user. Therefore, when the maximum degree of similarity calculated by the authentication assessment section 343 is higher than the user determination threshold value, the user determination section 346 may also assess whether or not the biometric information of the registered user corresponding to the maximum degree of similarity shows an over-time change from when it is registered. Only when assessing that the biometric information of the registered user shows an over-time change, the user determination section 346 may assess that the log-in-asking user is the registered user corresponding to the maximum degree of similarity. Accordingly, the user determination section 346 can favorably reduce any possibility of erroneously assessing a wrong person as a registered user.

For assessing whether or not the biometric information of any registered user shows an over-time change, similarly to the verification process change section 345, the user determination section 346 assesses whether or not a first change requirement is satisfied, i.e., the requirement is about changing the type of the verification process from "high-speed" to "precise" for execution. When assessing that the first change requirement is satisfied, the user determination section 346 assesses that the biometric information of any of the registered users corresponding to the maximum degree of similarity shows an over-time change.

On the other hand, when assessing that the first change requirement is not satisfied, the user determination section 346 assesses that the biometric information of any of the registered users corresponding to the maximum degree of similarity does not show an over-time change. To be more specific, the user determination section 346 reads, from the storage section 32, any of the verification history tables correlated with the registered user corresponding to the maximum degree of similarity based on the identification information provided by the processing section 33.

By referring to the verification history table read as such, the user determination section 346 then calculates an over-time change assessment value. The over-time change assessment value here is assumed as being the same as any of the precise assessment values described above in the first embodiment about the verification process change section 335 in the processing section 33. Assuming if the over-time change assessment value is an average degree of similarity calculated within a most-recent fixed period of time, when the over-time change assessment value is smaller than an over-time change assessment threshold value, the user determination section 346 assesses that the biometric information of the registered user shows an over-time change.

Also assuming if the over-time change assessment value is a value distribution of the degree of similarity, when the over-time change assessment value is larger than the over-time change assessment threshold value, the user determination section 346 assesses that the biometric information of the registered user shows an over-time change. Note here that such an over-time change assessment threshold value is assumed as being the same as the precise assessment threshold value described above in the first embodiment about the verification process change section 335 in the processing section 33.

The user determination section 346 notifies the processing section 33 of the assessment result about whether or not the user who asks for log-in is the registered user corresponding to the maximum degree of similarity calculated as a result of the verification process.

When the user determination section 346 assesses that the user who asks for log-in is the registered user corresponding to the maximum degree of similarity as a result of the verification process, the processing section 33 forwards, to the verification history update section 344, the authentication result information including the maximum degree of similarity together with the identification information of the registered user corresponding to the maximum value.

On the other hand, when the user determination section 346 assesses that the log-in-asking user is not any of the registered users, the processing section 33 does not invoke the verification history update section 344, and discards the authentication result information such as the degree of similarity calculated for the log-in-asking user.

Every time the biometric authentication process is executed, the verification history update section 344 records the authentication result information indicating the result of the biometric authentication process into any of the verification history tables related to the registered user assessed by the authentication assessment section 343 as corresponding to the authenticated user. Alternatively, every time the biometric authentication process is executed, the verification history update section 344 records the authentication result information into the verification history table related to the registered user determined by the user determination section 346. Herein, the verification history table is similar to the one to be used in the processing section 33 of the first embodiment, and an example thereof is shown in FIG. 4. Therefore, no detailed description about the verification history table is provided herein again.

Figure 9:
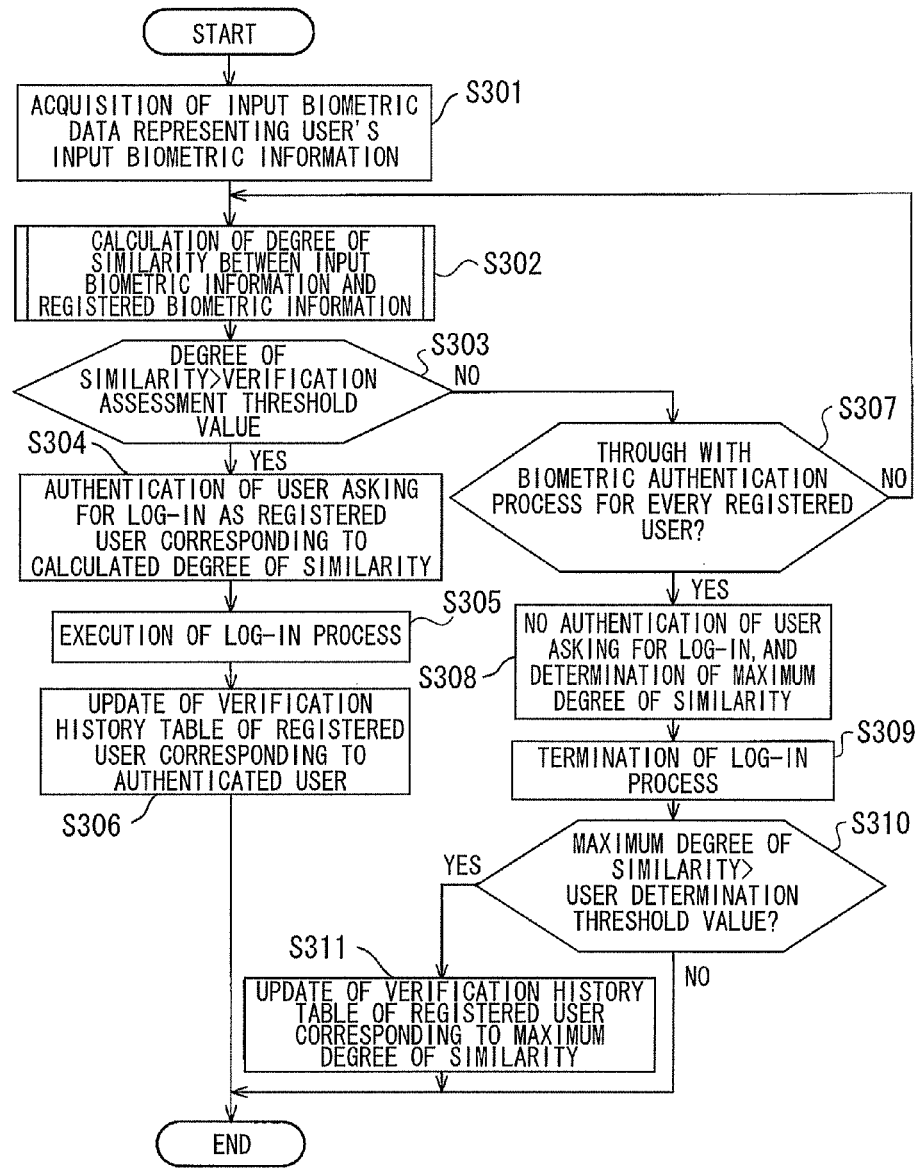
FIG. 9 is an exemplary flowchart of the operation of the biometric authentication process to be executed in the server of the second embodiment.

FIG. 9 is a flowchart of the operation of a biometric authentication process following a computer program to be run by the processing section 33 of the server 3 in the second embodiment. With the operation flowchart of FIG. 9, every time a degree of similarity is calculated for between input biometric information of a log-in-asking user and registered biometric information of every registered user, the processing section 33 assesses whether or not there is a coincidence therebetween.

First of all, when a log-in request is provided from the terminal 2 to the server 3, the processing section 33 acquires input biometric data representing input biometric information about a user who asks for log-in from the terminal 2 (Operation S301). Next, the processing section 33 reads, from the storage section 32, the registered biometric data of any of the registered users, and then verifies the input biometric information against registered biometric information found in the registered biometric data. The processing section 33 then calculates a degree of similarity between the input biometric information and the registered biometric information (Operation S302). Note here that the processing section 33 executes the process in operation S302 in accordance with the operation flowchart of FIG. 7 similarly to the computer system 1 in the first embodiment.

Next, the authentication assessment section 343 in the processing section 33 assesses whether or not the calculated degree of similarity is larger than a verification assessment threshold value (operation S303). When assessing that the degree of similarity is larger than the verification assessment threshold value (operation S303: Yes), the authentication assessment section 343 then assesses that there is a coincidence between the input biometric information and the registered biometric information. The authentication assessment section 343 then authenticates a user who asks for log-in from the terminal 2 as a registered user corresponding to the calculated degree of similarity (operation S304).

The authentication assessment section 343 then notifies the processing section 33 of the authentication result indicating a success in authentication. The processing section 33 then forwards, to the verification history update section 334 in the processing section 33, the authentication result information provided by the authentication assessment section 343 together with the identification information of the registered user corresponding to the authenticated user. After completion of the user authentication as such, the processing section 33 executes a log-in process (operation S305). The verification history update section 344 then updates the verification history table of the registered user corresponding to the authenticated user based on the verification result information provided by the processing section 33 (operation S306). Thereafter, the processing section 33 terminates the biometric authentication process.

On the other hand, when the degree of similarity is equal to or smaller than the verification assessment threshold value (operation S303: No), the processing section 33 assesses whether or not all of the registered users are through with the biometric authentication process (operation S307). When not all of the registered users are yet through with the biometric authentication process (operation S307: No), the processing section 33 executes the process in operation S302 and thereafter to the registered user(s) not yet through with the biometric authentication process.

On the other hand, when all of the registered users are through with the biometric authentication process (operation S307: Yes), the authentication assessment section 343 assesses that there is no coincidence between the input biometric information and the registered biometric information of the registered users. In this case, the authentication assessment section 343 does not authenticate the user who asks for log-in from the terminal 2 (operation S308).

The authentication assessment section 343 then determines a maximum degree of similarity from the calculated values of the degree of similarity. The authentication assessment section 343 also forwards, to the processing section 33, the maximum degree of similarity together with the authentication result indicating a failure in authentication. The processing section 33 then forwards the provided maximum degree of similarity to the user determination section 346 therein. The processing section 33 also terminates the log-in process (operation S309).

Next, the user determination section 346 assesses whether or not the maximum degree of similarity is larger than a user determination threshold value (operation S310). When the maximum degree of similarity is assessed as being equal to or smaller than the user determination threshold value (operation S310: No), it means that the user who asks for log-in corresponds to none of the registered users. Accordingly, when receiving the result of assessment telling that the log-in-asking user corresponds to none of the registered users from the user determination section 346, the processing section 33 terminates the biometric authentication process without updating all of the verification history tables of the registered users.

On the other hand, when the maximum degree of similarity is assessed as being larger than the user determination threshold value (operation S310: Yes), the user determination section 346 assesses that the log-in-asking user is the registered user corresponding to the maximum degree of similarity. When receiving the result of assessment telling that the user is the registered user corresponding to the maximum degree of similarity from the user determination section 346, the processing section 33 forwards, to the verification history update section 344, the authentication result information including the maximum degree of similarity together with the identification information of the registered user corresponding to the maximum degree of similarity. The verification history update section 344 then updates the verification history table of the registered user corresponding to the maximum degree of similarity based on the authentication result information provided by the processing section 33 as such, (operation S311). The processing section 33 then terminates the biometric authentication process.

Figure 10:
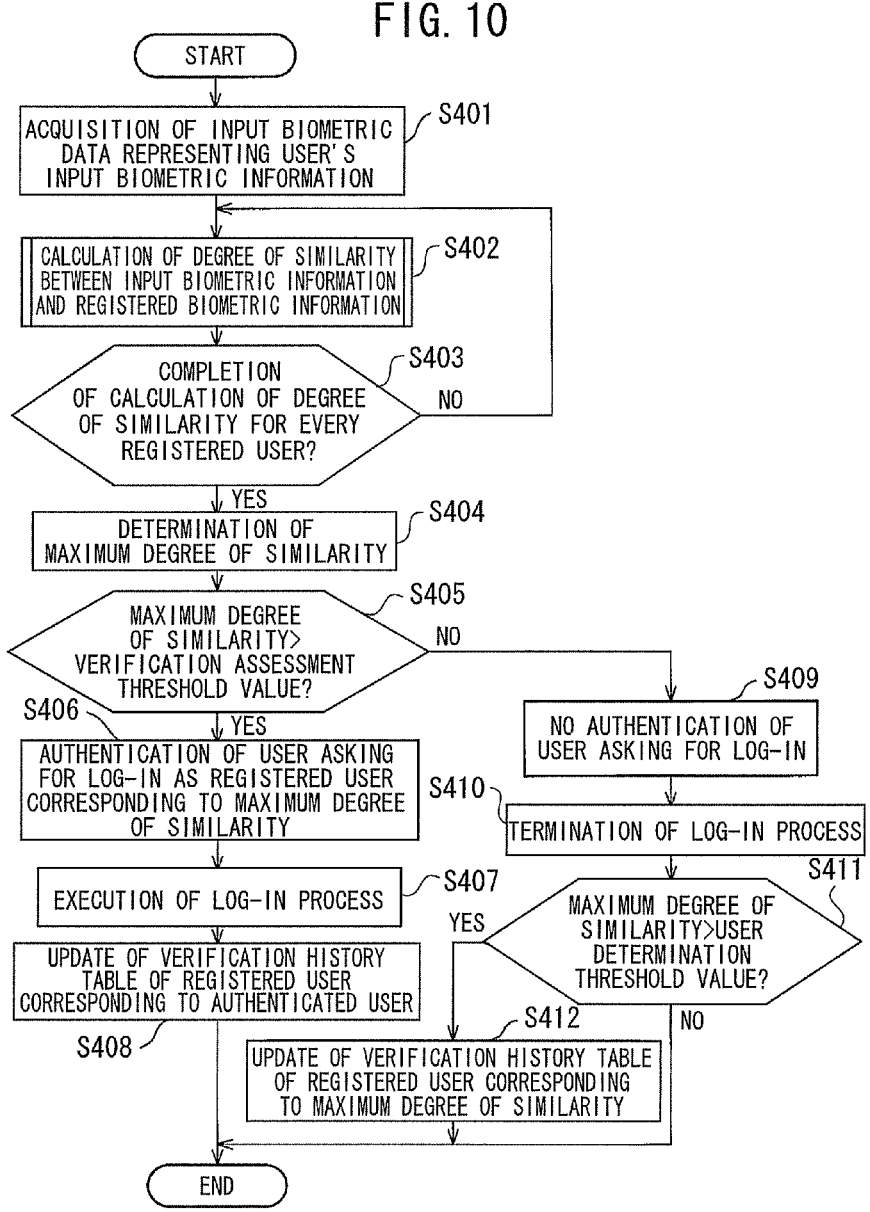
FIG. 10 is another exemplary flowchart of the operation of the biometric authentication process to be executed in the server of the second embodiment.

FIG. 10 is another exemplary flowchart of the operation of a biometric authentication process following a computer program to be run by the processing section 33 of the server 3 in the second embodiment. With the operation flowchart of FIG. 10, the processing section 33 calculates a maximum degree of similarity for between input biometric information of a log-in-asking user and registered biometric information of every registered user, and compares only the maximum degree of similarity with a verification assessment threshold value.

First of all, when a log-in request is provided from the terminal 2 to the server 3, the processing section 33 acquires input biometric data representing input biometric information of a user who asks for log-in from the terminal 2 (Operation S401). Next, the processing section 33 reads registered biometric data of each of the registered users from the storage section 32, and then verifies the input biometric information against registered biometric information found in the registered biometric data. The processing section 33 then calculates a degree of similarity between the input biometric information and the registered biometric information (Operation S402). The processing section 33 then forwards, to the authentication assessment section 343, the degree of similarity together with identification information about any of the registered users corresponding thereto. Herein, the processing section 33 executes the process in operation S402 in accordance with the operation flowchart of FIG. 7 similarly to the computer system 1 in the first embodiment.

Next, the processing section 33 assesses whether or not all of the registered users are through with the calculation of the degree of similarity (operation S403). When not all of the registered users are through with the calculation of the degree of similarity (operation S403: No), the processing section 33 executes the process in operation S402 to the registered user (s) not yet through with the calculation of the degree of similarity.

On the other hand, when all of the registered users are through with the calculation of the degree of similarity (operation S403: Yes), the authentication assessment section 343 determines a maximum degree of similarity from the values of the degree of similarity calculated for the registered biometric information of all of the registered users (operation S404). The authentication assessment section 343 then assesses whether or not the maximum degree of similarity is larger than a verification assessment threshold value (operation S405).

When the maximum degree of similarity is larger than the verification assessment threshold value (operation S405: Yes), the authentication assessment section 343 assesses that the input biometric information coincides with the registered biometric information corresponding to the maximum degree of similarity. The authentication assessment section 343 then authenticates the user who asks for log-in from the terminal 2 as a registered user corresponding to the maximum degree of similarity (operation S406). The authentication assessment section 343 then notifies the processing section 33 of the authentication result indicating a success authentication.

The processing section 33 then forwards, to the verification history update section 344, the authentication result information provided by the authentication assessment section 343 together with the identification information of the registered user corresponding to the authenticated user. After the completion of the user authentication as such, the processing section 33 executes a log-in process (operation S407). The verification history update section 344 then updates the verification history table of the registered user corresponding to the authenticated user based on the verification result information (operation S408). Thereafter, the processing section 33 terminates the biometric authentication process.

On the other hand, when the maximum degree of similarity is equal to or smaller than the verification assessment threshold value (operation S405: No), the authentication assessment section 343 assesses that the input biometric information does not coincide with the registered biometric information of any of the registered users. In this case, the authentication assessment section 343 does not authenticate the user who asks for log-in from the terminal 2 (operation S409). The authentication assessment section 343 then forwards, to the processing section 33, the authentication result indicating a failure authentication together with the maximum degree of similarity. The processing section 33 then forwards the provided maximum degree of similarity to the user determination section 346. The processing section 33 then terminates the log-in process (operation S410).

Next, the user determination section 346 assesses whether or not the maximum degree of similarity is larger than a user determination threshold value (operation S411). When the maximum degree of similarity is equal to or smaller than a user determination threshold value (operation S411: No), it means that the user who asks for log-in corresponds to none of the registered users. Accordingly, when receiving from the user determination section 346 the result of assessment telling that the log-in-asking user does not correspond to any of the registered users, the processing section 33 terminates the biometric authentication process without updating all of the verification history tables of the registered users.

On the other hand, when the maximum degree of similarity is larger than the user determination threshold value (operation S411: Yes), the user determination section 346 assesses that the user who asks for log-in is the registered user corresponding to the maximum degree of similarity. When receiving from the user determination section 346 the result of assessment telling that the log-in-asking user is the registered user corresponding to the maximum degree of similarity, the processing section 33 forwards, to the verification history update section 344, the authentication result information including the maximum degree of similarity together with the identification information of the registered user corresponding to the maximum degree of similarity. The verification history update section 344 then updates the verification history table of the registered user corresponding to the maximum degree of similarity based on the authentication result information provided by the processing section 33 (operation S412). The processing section 33 then terminates the biometric authentication process.

Figure 11:
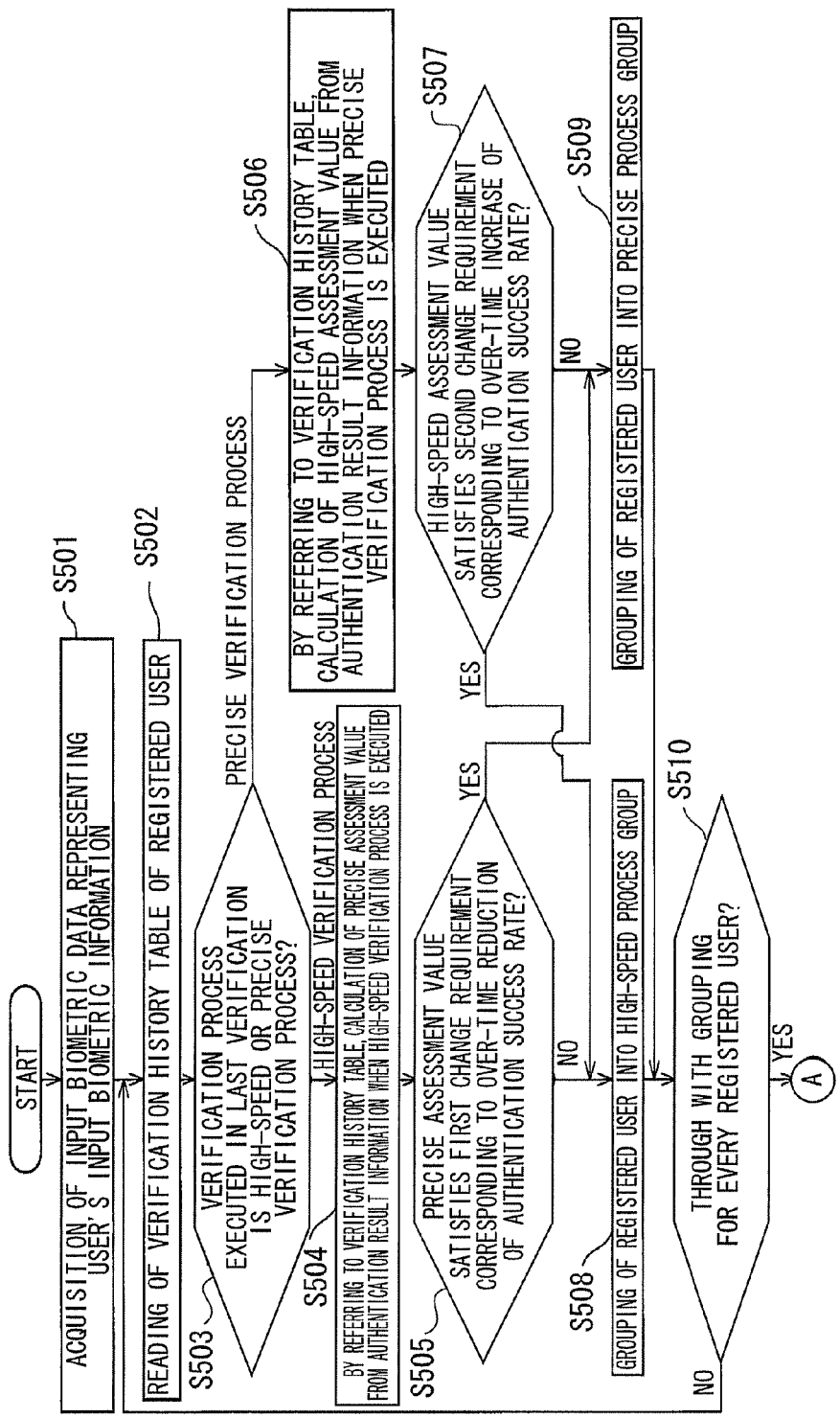
FIG. 11 is still another exemplary flowchart of the operation of the biometric authentication process to be executed in the server of the second embodiment.
Figure 12:
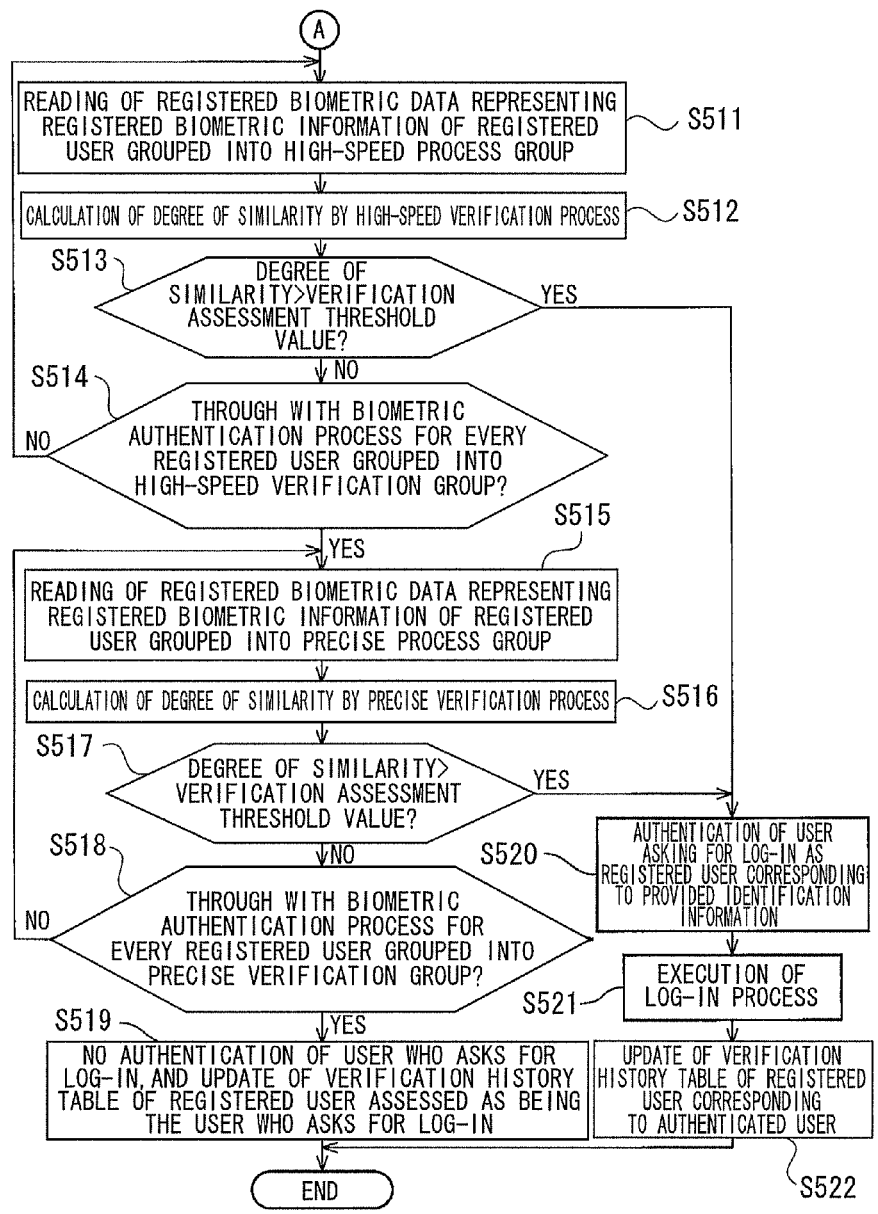
FIG. 12 is still another exemplary flowchart of the operation of the biometric authentication process to be executed in the server of the second embodiment.

FIGS. 11 and 12 are each still another exemplary flowchart of the operation of a biometric authentication process following a computer program to be run by the processing section 33 of the server 3 in the second embodiment. With the operation flowcharts of FIGS. 11 and 12, first of all, the processing section 33 determines the type of the verification process, i.e., "high-speed" or "precise", for execution to every registered user. The processing section 33 then executes a biometric authentication process only to the registered user(s) determined as being under the execution of the high-speed verification process.

Only when none of the registered users under the execution of the high-speed verification process is determined as a log-in-asking user, the processing section 33 executes a biometric authentication process to any of the registered users determined as being under the execution of the precise verification process. This thus reduces any possibility of erroneously executing the precise verification process to the registered user(s), the processing section 33 can favorably reduce the processing time needed for completion of verification.

As shown in FIG. 11, first of all, when a log-in request is provided from the terminal 2 to the server 3, the processing section 33 acquires input biometric data representing input biometric information of a user who asks for log-in from the terminal 2 (Operation S501). Next, the processing section 33 reads any of the verification history tables of the registered user(s) who are not yet determined with which type of verification process (operation S502). The verification process change section 345 in the processing section 33 then specifies the type of the verification process executed in the last verification process, i.e., "high-speed" or "precise", by referring to the verification history table read as such (operation S503).

In operation S503, when the type of the verification process executed in the last verification process is "high-speed", the verification process change section 345 refers to the verification history table to calculate a precise assessment value from the authentication result information when the high-speed verification process is executed (operation S504). The verification process change section 345 then assesses whether or not the precise assessment value satisfies a first change requirement about an over-time reduction of the authentication success rate for the registered biometric information about the registered user (operation S505).

When assessing that the first change requirement is not satisfied (operation S505: No), the verification process change section 345 puts the registered user into a high-speed process group for execution of the high-speed verification process (operation S508). The verification process change section 345 then correlates the registered user with a flag indicating the execution of the high-speed verification process. On the other hand, when assessing that the first change requirement is satisfied (operation S505: Yes), the verification process change section 345 puts the registered user into a precise process group for execution of the precise verification process (operation S509). The verification process change section 345 then correlates the registered user with a flag indicating the execution of the precise verification process.

In operation S503, when the type of the verification process executed in the last verification process is determined as being "precise", the verification process change section 345 refers to the verification history table to calculate a high-speed assessment value from the authentication result information when the precise verification process is executed (operation S506). The verification process change section 345 then assesses whether or not the high-speed assessment value satisfies a second change requirement about an over-time increase of the authentication success rate for the registered biometric information about the registered user (operation S507).

When assessing that the second change requirement is not satisfied (operation S507: No), the verification process change section 345 puts the registered user into the precise process group for execution of the precise verification process (operation S509). The verification process change section 345 then correlates the registered user with a flag indicating the execution of the precise verification process. On the other hand, when assessing that the second change requirement is satisfied (operation S507: Yes), the verification process change section 345 puts the registered user into the high-speed process group for execution of the high-speed verification process (operation S508). The verification process change section 345 then correlates the registered user with a flag indicating the execution of the high-speed verification process.

After operation S508 or S509, the processing section 33 assesses whether or not all of the registered users are through with such grouping about the type of the verification process for execution (operation S510). When not all of the registered users are yet through with the grouping about the type of the verification process for execution (operation S510: No), the processing section 33 repeats the processes in operation S502 to S509 for the registered user(s) not yet through with the grouping about the type of the verification process for execution.

On the other hand, when all of the registered users are through with the grouping about the type of the verification process for execution (operation S510: Yes), the processing section 33 selects any of the registered users grouped into the high-speed process group by referring to the flags respectively correlated with the registered users. Then as shown in FIG. 12, the processing section 33 reads, from the storage section 32, the registered biometric data representing the registered biometric information about the selected registered user (operation S511). The processing section 33 then calculates a degree of similarity between the input biometric information and the registered biometric information by executing the high-speed verification process (operation S512). The processing section 33 then forwards, to the authentication assessment section 343, the degree of similarity calculated with the high-speed verification process executed as such.

Next, the authentication assessment section 343 assesses whether or not the value of the calculated degree of similarity is larger than a verification assessment threshold value (operation S513). When the value of the degree of similarity is assessed as being larger than the verification assessment threshold value (operation S513: Yes), the authentication assessment section 343 assesses that the input biometric information coincides with the registered biometric information. The authentication assessment section 343 then authenticates the user who asks for log-in from the terminal 2 as a registered user corresponding to the calculated degree of similarity (operation S520).

The authentication assessment section 343 then notifies the processing section 33 of the authentication result indicating a success authentication together with the identification information of the registered user corresponding to the authenticated user. The processing section then forwards, to the verification history update section 344, the authentication result information provided by the authentication assessment section 343 together with the identification information of the registered user corresponding to the authenticated user. After the completion of the user authentication as such, the processing section 33 executes a log-in process (operation S521). Based on the authentication result information, the verification history update section 344 then updates the verification history table of the registered user corresponding to the authenticated user (operation S522). The processing section 33 then terminates the biometric authentication process.

On the other hand, when the degree of similarity is assessed as being equal to or smaller than the verification assessment threshold value (operation S513: No), the processing section 33 assesses whether or not all of the registered users grouped into the high-speed process group are through with the biometric authentication process (operations 514). When not all of the registered users grouped into the high-speed process group are yet through with the biometric authentication process (operation S514: No), the processing section 33 executes the process in operation S511 and thereafter for the registered user(s) not yet through with the biometric authentication process.

On the other hand, when all of the registered users grouped into the high-speed process group are through with the biometric authentication process (operation S514: Yes), by referring to the flags respectively correlated with the registered users, the processing section 33 selects any of the registered users grouped into the precise verification process group. The processing section 33 then reads, from the storage section 32, the registered biometric data representing the registered biometric information of the selected registered user (operation S515). The processing section 33 then calculates a degree of similarity between the input biometric information and the registered biometric information with the precise verification process executed (operation S516). The processing section 33 then forwards, to the authentication assessment section 343, the degree of similarity calculated with the precise verification process executed as such.

Next, the authentication assessment section 343 assesses whether or not the value of the calculated degree of similarity is larger than the verification assessment threshold value (operation S517). When the degree of similarity is determined as being larger than the verification assessment threshold value (operation S517: Yes), the authentication assessment section 343 assesses that the input biometric information coincides with the registered biometric information. The processing section 33 executes the processes in operations S520 to S522, and then terminates the biometric authentication process.

On the other hand, when the value of the calculated degree of similarity is assessed as being equal to or smaller than the verification assessment threshold value (operation S517: No), the processing section 33 assesses whether or not all of the registered users grouped into the precise process group are through with the biometric authentication process (operation S518). When not all of the registered users grouped into the precise process group are yet through with the biometric authentication process (operation S518: No), the processing section 33 executes the process in operation S515 and thereafter for the registered user(s) not yet through with the biometric authentication process.

On the other hand, when all of the registered users grouped into the precise process group are through with the biometric authentication process (operation S518: Yes), the authentication assessment section 343 assesses that there is no coincidence between the input biometric information and the registered biometric information of any of the registered users. In this case, the authentication assessment section 343 does not authenticate the user who asks for log-in from the terminal 2, and the processing section 33 terminates the log-in process. The processing section 33 then executes the processes in operations S411 and S412 of the operation flowchart of FIG. 10. When there is any registered user assessed as being the user who asks for log-in, the processing section 33 updates the verification history table of the registered user (operation S519). The processing section 33 then terminates the biometric authentication process.

Herein, as described in the first embodiment about the verification process change section 335, the verification process change section 345 may determine the type of the verification process for execution at the timing other than when the server 3 is provided with a log-in request. If this is the case, the processing section 33 creates in advance such a reference table as shown in FIG. 5 recorded with flags indicating the types of the verification process for execution to each of the registered users, and the resulting table is stored in the storage section 32. By referring to such a reference table, the processing section 33 can determine the type of the verification process for execution to each of the registered users so that the above-described processes in operations S502 to S510 may be skipped.

As described in the foregoing, the computer system of the second embodiment assesses whether or not to permit a user to log-in the computer system based on the result of a biometric authentication process between his or her input biometric information and registered biometric information of a plurality of registered users. When succeeding in the user authentication, the computer system records information about the authentication result to a verification history table of the registered user assessed as being the log-in-asking user. On the other hand, even if failing in the user authentication, this computer system assesses whether or not the log-in-asking user is any of the registered users corresponding to a maximum degree of similarity calculated as a result of the verification process. When assessing that the log-in-asking user is the registered user corresponding to the maximum degree of similarity, the computer system records the information about the authentication result to the verification history table of the registered user.

As such, although the input biometric information of a log-in-asking user is verified against the registered biometric information of a plurality of registered users, the computer system can correctly record information about the authentication result for each of the registered users. Accordingly, with such a computer system, by checking the authentication result in the past by referring to the verification history table provided for each of the registered users, a verification process can be appropriately selected for execution.

As such, described above is the computer system adopting the biometric authentication device or method of the invention. However, the biometric authentication device and method of the invention are surely not restrictive to those described in the above embodiments.

For example, when input biometric data is subjected to preprocessing as a part of a precise verification process, instead of the processing section in the server executing the preprocessing, the terminal may execute the preprocessing. When the terminal executes the preprocessing, before the input biometric data is provided to the server, the terminal makes an inquiry to the server whether or not such preprocessing is required. Then the server assesses whether or not the verification process change section in the processing section executes the precise verification process to any of the registered users being a target of the biometric authentication process.

When the verification process change section assesses to execute the precise verification process to any of the registered users, the server forwards a signal to the terminal for execution of the preprocessing. Upon reception of such a signal to execute the preprocessing, the terminal accordingly executes the preprocessing with respect to the input biometric data. The terminal then forwards the data through with preprocessing as such to the server together with or instead of the input biometric data.

Further, the processing section in the server can additionally use, as an index for changing the verification process for execution, quality information about the input biometric data representing the input biometric information used for verification. When data representing the biometric information used for verification is a fingerprint image, for example, the quality of the input biometric data can be determined based on the degree of enhancement of a ridge pattern.

If a fingerprint sensor cannot read a height difference between a ridge and a valley due to skin wetness due to sweat or skin dryness, for example, pixels in the fingerprint image all take considerably high or low values. This thus reduces the definition of the ridge pattern. In consideration thereof, in the above embodiments, when receiving an input fingerprint image from the terminal, the processing section in the server divides the input fingerprint image into a plurality of small areas. The resulting small areas are each preferably of a size including a plurality of ridges and a plurality of valleys. The processing section then finds the histogram of a pixel value of each of the small areas.

By checking such a histogram, when finding out that the distribution of the pixel values in any specific small area is not well balanced, i.e., shows quite a deviation toward the side of the large values or of the small values, the processing section regards the small area as a low-quality area. Herein, the pixel values are counted in a descending order, and when the resulting cumulative value exceeds 80% of the entire histogram, if the pixel value at this time is found in the range especially in the top 10% of all of the values possibly taken by the pixel values, the processing section assesses that the distribution of the pixel values shows a large deviation toward the side of the large values. Moreover, the pixel values are counted in an ascending order, and when the resulting cumulative value exceeds 80% of the entire histogram, if the pixel value at this time is found in the range especially in the bottom 10% of all of the values possibly taken by the pixel values, the processing section assesses that the distribution of the pixel values shows a large deviation toward the side of the small values.

The processing section determines the quality of an input fingerprint image depending on a ratio of the number of the small areas determined as being the low-quality areas to the total number of the small areas in the fingerprint image. When the resulting ratio is equal to 50% or higher, for example, the processing section regards the input fingerprint image as having the low quality, and when the resulting ratio is lower than 50%, the processing section regards the input fingerprint image as having the high quality. Alternatively, the processing section may use such a resulting ratio itself as the quality of the input fingerprint image. The processing section then records the quality of the input fingerprint image to a verification history table with a correlation with a registered fingerprint image being verified with the input fingerprint image.

FIG. 13 is a diagram showing another exemplary verification history table. A verification history table 1300 of FIG. 13 carries, on a line basis, authentication result information about a biometric authentication process similarly to the verification history table 400 of FIG. 4. Compared with the verification history table 400, there is a difference that the verification history table 1300 is additionally provided with an element of "quality" in a right column, indicating a value denoting the quality of an input fingerprint image used for a biometric authentication process. With authentication result information at the top line, for example, a column 1310 indicating the quality of the input fingerprint image is recorded with a value of "1" indicating that the input fingerprint image is of a high quality. With authentication result information at the second line from the bottom, for example, a column 1320 indicating the quality of the input fingerprint image is recorded with a value of 0" indicating that the input fingerprint image is of a low quality.

For assessing whether or not to change the type of the verification process for execution, the verification process change section in the processing section uses, as an assessment criterion, the quality of an input fingerprint image recorded in a verification history table. When assessing that a first change requirement corresponding to an over-time reduction of an authentication success rate for a registered user is satisfied using any of the methods described in the above embodiments, for example, the verification process change section then checks the quality of an input fingerprint image.

Thereafter, when determining that some reduction of the quality is observed in the input fingerprint image recorded in the verification history table with a correlation with the most-recent result of the biometric authentication for a predetermined number of times from the quality of a registered fingerprint image of the registered user at the time of registration, the verification process change section changes the type of the verification process to "precise" for execution. Note here that the most-recent predetermined number of times is set to a value from 1 to 5, for example. When the input fingerprint image during the last verification is low in quality, for example, the verification process change section changes the type of the verification process to "precise" for execution.

Alternatively, when the value indicating the quality of the input fingerprint image recorded in the verification history table is a ratio of the number of the small areas determined as being the low-quality areas to the total number of the small areas in the input fingerprint image, the verification process change section calculates an average value or a distribution value of the ratios derived for most-recent predetermined number of times. When the resulting average value or distribution value is larger than a predetermined threshold value, the verification process change section may change the type of the verification process to "precise" for execution. Moreover, the storage section may store therein in advance the quality for each registered fingerprint image. If this is the case, when the input fingerprint image has the quality lower than that of the registered fingerprint image being a target for verification, the verification process change section may change the type of the verification process to "precise" for execution.

Still further, in the embodiments described above, for verifying the input biometric information against the registered biometric information, the processing section executes either the high-speed or precise verification process. Alternatively, from three or more verification processes varying in amount of computation, the processing section may select any one of those. The processing section may execute the selected verification process for verifying the input biometric information against the registered biometric information. When the verification process is pattern matching between images capturing the biometric information, for example, the processing section can increase the size of an image area for use in the pattern matching with a verification process executed more precisely with a larger amount of computation.

Moreover, when the verification process is executed by characteristic-point matching with which a degree of coincidence between characteristic points extracted from the biometric information is checked, the processing section can increase the number of types of the characteristic points to be extracted, or can increase the number of types of the characteristic amount related to the characteristic points if the verification process is executed with a higher precision with a larger amount of computation. Also when the verification process is executed by such characteristic-point matching, the processing section can increase the size of an image area being a target for extraction of the characteristic points if the verification process is executed with a higher precision with a larger amount of computation.

As described above, because the verification process requiring a larger amount of computation enables the processing section to verify the input biometric information against the registered biometric information with a higher precision using a larger amount of information, the verification process executed with a higher precision while requiring a larger amount of computation can increase the authentication success rate. For the processing section, on the other hand, the high-speed verification process requiring a less amount of computation can reduce the processing time needed for completion of a verification process.

Also in this case, the processing section can change the type of the verification process for execution based on the result of the biometric authentication process executed in the past. Therefore, by referring to the verification history tables stored in the storage section, the verification process change section in the processing section calculates a precise assessment value for the verification process currently in progress, and then compares the resulting precise assessment value with a precise assessment threshold value. Based on the result of the comparison, when assessing that the first change requirement is satisfied, the verification process change section changes the type of the verification process to another requiring a larger amount of computation than the current verification process in progress. Herein, as described in the above embodiments, the first change requirement corresponds to a reduction of the authentication success rate over time with respect to the registered user being a target of the biometric authentication process.

On the other hand, by referring to the verification history tables stored in the storage section, the verification process change section calculates a high-speed assessment value for the verification process currently in progress, and then compares the resulting high-speed assessment value with a high-speed assessment threshold value. Based on the result of the comparison, when assessing that the second change requirement is satisfied, the verification process change section changes the type of the verification process to another requiring a smaller amount of computation than the current verification process in progress. Herein, as described in the above embodiments, the second change requirement corresponds to an increase of the authentication success rate over time with respect to the registered user being a target of the biometric authentication process. As to the such values, i.e., the precise assessment value, the precise assessment threshold value, the high-speed assessment value, and the high-speed assessment threshold value, are determined as described in the above embodiments.

The server of the computer system adopting the biometric authentication device or method of the invention may execute the biometric authentication process described above when a user makes an attempt to make an access to a specific storage area in the storage section of the server.

The biometric authentication device or method of the invention is applicable also to various types of devices and systems that execute a biometric authentication process between user's biometric information and biometric information registered in advance to see whether or not a user asking for log-in has been registered or not for operation. Such devices or systems include a computer of a so-called desk-top type or notebook type, and an Automated Teller Machine System (ATM system).

Figure 14:
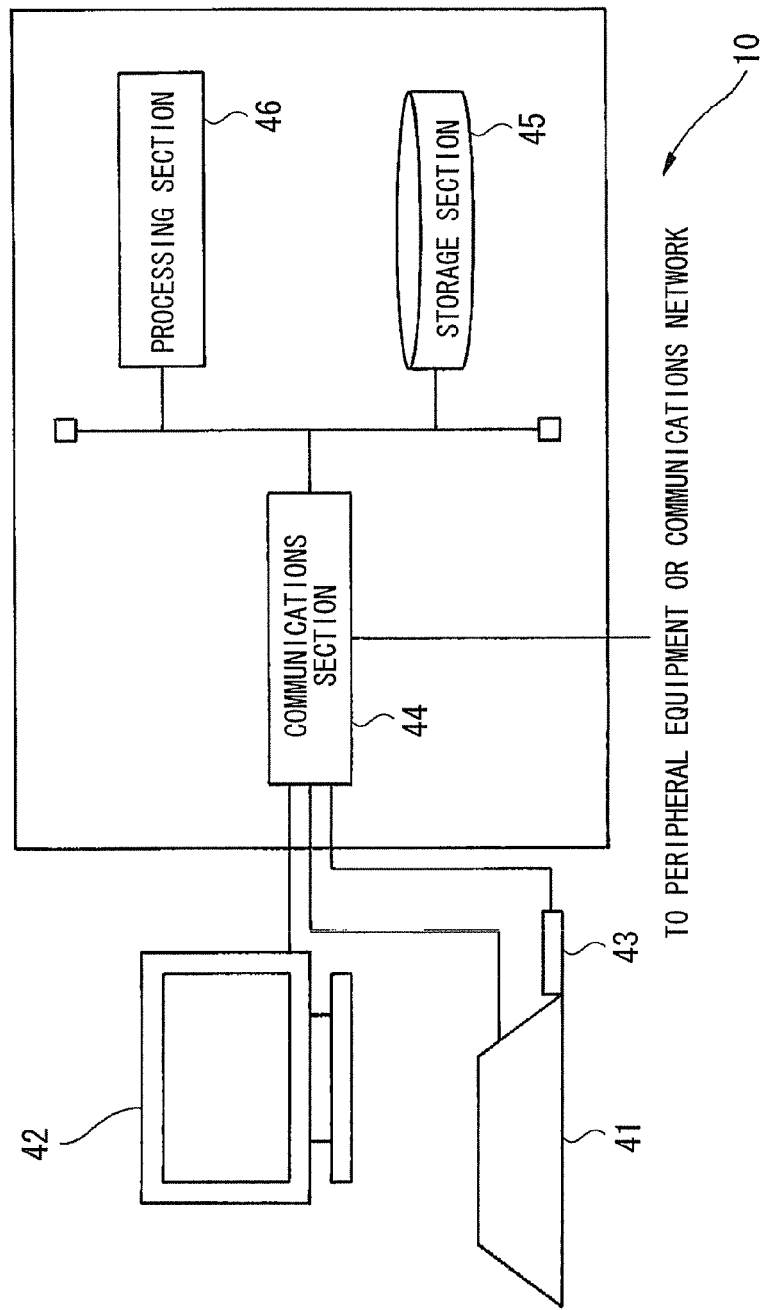
FIG. 14 is a schematic diagram showing the configuration of a computer adopting the biometric authentication device or method of the invention.

FIG. 14 is a schematic diagram showing the configuration of a computer adopting the biometric authentication device or method of the invention. As shown in FIG. 14, a computer 10 adopting the biometric authentication device or method of the invention is configured to include an input section 41, a display section 42, a biometric information input section 43, a communications section 44, a storage section 45, and a processing section 46. The computer 10 also executes a biometric authentication process using biometric information about a user when he or she asks for log-in to the computer 10. As a result of the biometric authentication process, when authenticating that the log-in-asking user is any one of registered users who have been registered in the computer 10 in advance, the computer 10 executes a log-in process. The computer 10 then gives permission to the user to use the computer 10.

The input section 41 includes an input device such as keyboard, mouse, or a touchpad. The input section 41 is used by a user for input of commands, data, and others. The input section 41 serves also as an identification information input section for input of user's identification information to the computer 10. The user's identification information may be a character string including alphanumeric characters or symbols, or the user's name. The commands, data or the user's identification information provided via the input section 41 are provided to the processing section 46.

The display section 42 includes a display device such as liquid crystal display or CRT (Cathode-Ray Tube) monitor. The display section 42 displays thereon the commands, the data, or the user's identification information provided to the computer 10 via the input section 41, various types of information related to an application run by the processing section 46, and others.

The biometric information input section 43 generates input biometric data that represents input biometric information used for a biometric authentication process. For example, the biometric information input section 43 serves to capture an image of a user's finger, which is the input biometric information, and generates, for use as the input biometric data, an input fingerprint image being an image of the captured fingerprint. For use as such, as in the biometric information input section 23 of FIG. 1, the biometric information input section 43 is provided with a fingerprint sensor (not shown). The fingerprint sensor can be an optical sensor of various types, e.g., total reflection, optical-path separation, inter-finger diffused-light detection, inter-finger characteristics detection, and surface enhanced irregular reflection. The fingerprint sensor can be also of a non-optical sensor of various types, e.g., capacitance-operated, electric field-operated, thermally-operated, pressure-sensitive, and ultrasonically-operated. The fingerprint sensor is not restrictive to be of area sensor type, and may be of line sensor type.

In such a configuration, the input section 41 and the biometric information input section 43 may be formed integrally.

When a user operates the input section 41 for log-in, the computer 10 displays messages on the display section 42, i.e., a message to prompt the user to input his or her identification information, and a message to prompt the user to place his or her finger on the biometric information input section 43. Herein, the operation asking for log-in is depressing, via the input section 41, a button displayed as "log-in" on the display section 42, for example. After acquiring input biometric data via the biometric information input section 43, the computer 10 correlates the input biometric data with the user's identification information provided via the input section 41.

The communications section 44 is configured to include a communications interface for connecting the computer 10 to a communications network (not shown) conforming to the communications standard such as the Ethernet™, or an ISDN, and a control circuit thereof. Alternatively, the communications section 44 may include a communications interface for connecting the computer 10 to its peripheral equipment, and a control circuit thereof. Such a communications interface for a connection with the peripheral equipment is exemplified by an interface conforming to the standard such as Universal Serial Bus (USB), or Small Computer System Interface (SCSI), for example. The computer 10 then communicates with any other devices over such a communications section 44.

The storage section 45 includes at least one of a semiconductor memory, a magnetic disk device, and an optical disk device, for example. The storage section 45 stores therein an application program to be used in the computer 10, identification information and individual setting information of at least one registered user, various types of data, and others. The storage section 45 also stores therein a program for execution of a biometric authentication process. The storage section 45 stores, for each registered user, registered biometric data representing registered biometric information. When the registered biometric information is the fingerprint of any of the registered user's fingers, for example, the storage section 45 stores a registered fingerprint image being an image of any of the fingers of the registered user as registered biometric data. The storage section 45 also stores therein, for each registered user, verification history information, flag information, and others. The verification history information is the one indicating the result of the biometric authentication process executed previously, and the flag information is about the type of a verification process for execution.

The processing section 46 includes one or more processors, and a peripheral circuit thereof. The processing section 46 executes commands or various types of applications provided via the input section 41. The processing section 46 also executes a process for user's log-in and log-out with respect to the computer system 10. When receiving via the input section 41 a user's request for execution of a log-in process with respect to the computer system 10, the processing section 46 accordingly executes a biometric authentication process using the user's biometric information.

For execution of the biometric authentication process, the processing section 46 implements the sections of FIG. 3 or 8. Note here that because the sections of FIG. 3 or 8 are already described above in detail, these sections are not described in detail again.

Moreover, with the device and method of the invention, the biometric information being a target for biometric authentication is surely not restrictive to a fingerprint. The biometric information being a target for biometric authentication may be arbitrarily about a palm print, a face, and others whatever can show any change of state over time. Especially when the biometric information is a palm print, by executing a verification process similarly to the verification process to be executed when the biometric information is a fingerprint, the device and method of the invention become able to calculate a degree of similarity between input biometric information and registered biometric information.

It is understood that those skilled in the art can devise numerous other modifications and variations without departing from the scope of the invention.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A biometric authentication device, comprising:
   a memory; and
   a processor coupled to the memory and configured to:
   acquire input biometric information of a user, and generate input biometric data representing the input biometric information;
   store registered biometric data representing registered biometric information of at least one registered user who is registered in advance;
   execute either a first verification process or a second verification process, wherein the first verification process calculates a first degree of similarity representing a degree of similarity between the input biometric information and the registered biometric information, and the second verification process calculates a second degree of similarity representing the degree of similarity between the input biometric information and the registered biometric information by verifying the input biometric information against the registered biometric information with higher precision than with the first verification process;
   authenticate, when the first or the second degree of similarity takes a value larger than a predetermined verification assessment threshold value, the user as the registered user corresponding to the registered biometric information;
   store the first degree of similarity calculated by the first verification process with a correlation with the registered biometric data representing the registered biometric information verified against the input biometric information; and
   change, by referring to the first degree of similarity correlated with the registered biometric data, when an authentication success rate indicating a rate of authenticating the registered user as the user is determined as showing an over-time reduction, the first verification process to the second verification process for execution.

2. The biometric authentication device according to claim 1, wherein
   when an average value of the first degree of similarity calculated by the first verification process in a predetermined period of time or an average value of the first degree of similarity calculated by the first verification process for a predetermined number of times is smaller than a predetermined threshold value, the processor assesses that the authentication success rate shows the over-time reduction.

3. The biometric authentication device according to claim 1, wherein
   when a value distribution of the first degree of similarity calculated by the first verification process in a predetermined period of time or a value distribution of the first degree of similarity calculated by the first verification process for a predetermined number of times takes a value larger than a predetermined threshold value, the processor assesses that the authentication success rate shows the over-time reduction.

4. The biometric authentication device according to claim 1, wherein
   when a reduction amount indicating a reduction of the first degree of similarity calculated by the first verification process at a second timing later than a first timing with respect to the first degree of similarity calculated by the first verification process at the first timing is larger than a predetermined threshold value, the processor assesses that the authentication success rate shows the over-time reduction.

5. The biometric authentication device according to claim 1, wherein
   when a ratio of frequency of authenticating, by the processor, the user as the registered user corresponding to the registered biometric information based on the first degree of similarity to frequency of assessing whether or not the user is the registered user corresponding to the registered biometric information based on the first degree of similarity is smaller than a predetermined threshold value, the processor assesses that the authentication success rate shows the over-time reduction.

6. The biometric authentication device according to claim 1, wherein
   every time the processor assesses whether or not to authenticate the user using the first degree of similarity calculated by the first verification process, quality information regarding the input biometric data is obtained and stored with a correlation with the registered biometric data representing the registered biometric information verified against the input biometric information, and
   when the authentication success rate shows the over-time reduction, the processor changes the first verification process to the second verification process for execution only when the quality information indicates that the input biometric data is lower in quality than the registered biometric data at the time of registration.

7. The biometric authentication device according to claim 1, wherein
   an amount of information included in the input biometric information or in the registered biometric information used in the second verification process is larger than an amount of information included in the input biometric information or in the registered biometric information used in the first verification process.

8. The biometric authentication device according to claim 1, wherein
   the input biometric data is an input image being a result of capturing the input biometric information, the registered biometric data is a registered image being a result of capturing the registered biometric information, the first verification process is executed to calculate, as the first degree of similarity, a degree of coincidence between a plurality of characteristic points extracted from the input image and a plurality of characteristic points extracted from the registered image, and the second verification process is executed to calculate, as the second degree of similarity, a degree of coincidence between a characteristic amount representing the plurality of characteristic points extracted from the input image and a relationship thereamong, and a characteristic amount representing the plurality of characteristic points extracted from the registered image and a relationship thereamong.

9. The biometric authentication device according to claim 1, wherein the processor stores the second degree of similarity calculated by the second verification process with a correlation with the registered biometric data representing the registered biometric information verified against the input biometric information, and the processor changes, when assessing that the authentication success rate shows an over-time increase by referring to the second degree of similarity correlated with the registered biometric data, the second verification process to the first verification process for execution.

10. The biometric authentication device according to claim 9, wherein verification of the user's input biometric information against the registered biometric information represented as the registered biometric data of the at least one registered user with either the first or the second verification process further comprises assessing, when a maximum value found among the first or the second degree of similarity calculated for each of the registered users of the registered biometric information is equal to or smaller than the predetermined verification assessment threshold value and is larger than a user determination threshold value being smaller than the predetermined verification assessment threshold value, the user as the registered user corresponding to the maximum value, and the processor stores the first or the second degree of similarity corresponding to the maximum value with a correlation with the registered biometric data of the registered user assessed as being the user.

11. A computer system having a terminal and a server connected to the terminal via a communication network, wherein the terminal acquires input biometric information of a user, generates input biometric data representing the input biometric information, and transmits the input biometric data to the server when the user uses the computer system, the server comprises:
a memory; and
a processor coupled to the memory and configured to:
receive the input biometric data from the terminal;
store therein registered biometric data representing registered biometric information of at least one registered user who is registered in advance;
execute either a first verification process or a second verification process, wherein the first verification process calculates a first degree of similarity representing a degree of similarity between the input biometric information and the registered biometric information, and the second verification process calculates a second degree of similarity representing the degree of similarity between the input biometric information and the registered biometric information by verifying the input biometric information against the registered biometric information with higher precision than with the first verification process;

authenticate, when the first or the second degree of similarity takes a value larger than a predetermined verification assessment threshold value, the user as the registered user corresponding to the registered biometric information;

store the first degree of similarity calculated by the first verification process with a correlation with the registered biometric data representing the registered biometric information verified against the input biometric information;

change, by referring to the first degree of similarity correlated with the registered biometric data, when an authentication success rate indicating a rate of authenticating the registered user as the user is determined as showing an over-time reduction, the first verification process to the second verification process for execution; and permit the user to use the computer system when the processor authenticates the user.

12. A computer, comprising:
a memory; and
a processor coupled to the memory and configured to:
acquire input biometric information of a user, and generate input biometric data representing the input biometric information;
store registered biometric data representing registered biometric information of at least one registered user who is registered in advance;
execute either a first verification process or a second verification process, wherein the first verification process calculates a first degree of similarity representing a degree of similarity between the input biometric information and the registered biometric information, and the second verification process calculates a second degree of similarity representing the degree of similarity between the input biometric information and the registered biometric information by verifying the input biometric information against the registered biometric information with higher precision than with the first verification process;

authenticate, when the first or the second degree of similarity takes a value larger than a predetermined verification assessment threshold value, the user as the registered user corresponding to the registered biometric information;

store the first degree of similarity calculated by the first verification process with a correlation with the registered biometric data representing the registered biometric information verified against the input biometric information;

change, by referring to the first degree of similarity correlated with the registered biometric data, when an authentication success rate indicating a rate of authenticating the registered user as the user is determined as showing an over-time reduction, the first verification process to the second verification process for execution; and permit the user to use the computer when the processor authenticates the user.

13. A non-transitory computer readable recording medium recording a computer program allowing a device having a storage to implement biometric authentication on input biometric information of a user of the device and registered biometric information of a registered user represented in registered biometric data stored in advance, the program causing the computer to execute:

executing either a first verification process or a second verification process, wherein the first verification process comprises calculating a first degree of similarity representing a degree of similarity between the input biometric information and the registered biometric information, and the second verification process comprises calculating a second degree of similarity representing the degree of similarity between the input biometric information and the registered biometric information by verifying the input biometric information against the registered biometric information with higher precision than with the first verification process;

authenticating, when the first or the second degree of similarity takes a value larger than a predetermined verification assessment threshold value, the user as the registered user corresponding to the registered biometric information;

storing the first degree of similarity calculated by the first verification process with a correlation with the registered biometric data representing the registered biometric information verified against the input biometric information; and changing, by referring to the first degree of similarity correlated with the registered biometric data, when an authentication success rate indicating a rate of authenticating the registered user as the user is determined as showing an over-time reduction, the first verification process to the second verification process for execution.

14. A biometric authentication method that authenticates a user by verifying input biometric information of the user represented in input biometric data generated by a processor having a memory against registered biometric information of a registered user represented in registered biometric data by executing either a first or a second verification process, the method comprising:

assessing whether or not an authentication success rate being a rate of authentication when the registered user corresponding to the registered biometric information is the user shows an over-time reduction by referring to a first degree of similarity indicating a result of a biometric authentication process previously executed by the first verification process, verifying, when the authentication success rate does not show the over-time reduction, the input biometric information against the registered biometric information by the first verification process, and calculating the first degree of similarity representing a degree of similarity between the input biometric information and the registered biometric information, verifying, when the authentication success rate shows the over-time reduction, the input biometric information against the registered biometric information by the second verification process with a higher precision than with the first verification process, and calculating a second degree of similarity representing a degree of similarity between the input biometric information and the registered biometric information, and authenticating, when the first or the second degree of similarity shows a value larger than a predetermined verification assessment threshold value, the user as the registered user corresponding to the registered biometric information.

\* \* \* \* \*

UNITED STATES PATENT AND TRADEMARK OFFICE
CERTIFICATE OF CORRECTION

PATENT NO.        : 8,816,818 B2
APPLICATION NO.   : 12/631263
DATED             : August 26, 2014
INVENTOR(S)       : Shigefumi Yamada et al.

It is certified that error appears in the above-identified patent and that said Letters Patent is hereby corrected as shown below:

On the Title Page, Item (73) Assignee

Delete "Fujjitsu" and insert -- Fujitsu --, therefor.

Signed and Sealed this
Twenty-fifth Day of November, 2014

Michelle K. Lee
*Deputy Director of the United States Patent and Trademark Office*